US012769992B2

(12) United States Patent
Chakrabartty et al.

(10) Patent No.: US 12,769,992 B2
(45) Date of Patent: Oct. 20, 2026

(54) METHOD FOR DESIGNING SCALABLE AND ENERGY-EFFICIENT ANALOG NEUROMORPHIC PROCESSORS

(71) Applicants: Shantanu Chakrabartty, St. Louis, MO (US); Ahana Gangopadhyay, St. Louis, MO (US)

(72) Inventors: Shantanu Chakrabartty, St. Louis, MO (US); Ahana Gangopadhyay, St. Louis, MO (US)

(73) Assignee: Washington University, St. Louis, MO (US)

( * ) Notice: Subject to any disclaimer, the term of this patent is extended or adjusted under 35 U.S.C. 154(b) by 1021 days.

(21) Appl. No.: 16/910,971

(22) Filed: Jun. 24, 2020

(65) Prior Publication Data

US 2020/0401876 A1 Dec. 24, 2020

Related U.S. Application Data

(60) Provisional application No. 62/865,703, filed on Jun. 24, 2019.

(51) Int. Cl.
*G06N 3/06* (2006.01)
*G06N 3/049* (2023.01)
(Continued)

(52) U.S. Cl.
CPC ............. *G06N 3/065* (2023.01); *G06N 3/049* (2013.01); *G06N 3/086* (2013.01)

(58) Field of Classification Search
CPC ........ G06N 3/065; G06N 3/049; G06N 3/086; G06N 3/08
See application file for complete search history.

(56) References Cited

U.S. PATENT DOCUMENTS 9,020,870 B1 * 4/2015 Daily .......................... B25J 9/00 706/20
9,311,594 B1 * 4/2016 Fisher .................... G06N 3/049
(Continued)

OTHER PUBLICATIONS

Gangopadhyay et al., A Coupled Network of Growth Transform Neurons for Spike-Encoded Auditory Feature Extraction, Apr. 2018, 17 pages (Year: 2018).*
(Continued)

*Primary Examiner* — Omar F Fernandez Rivas
*Assistant Examiner* — Tri T Nguyen
(74) *Attorney, Agent, or Firm* — Armstrong Teasdale LLP

(57) ABSTRACT

A spiking neural network includes a plurality of neurons implemented in respective circuits. Each neuron produces a continuous-valued membrane potential according to a Growth Transform bounded by an extrinsic energy constraint. The continuous-valued membrane potential is defined as a function of spiking current received from another neuron in the plurality of neurons, and a received electrical current stimulus. The spiking neural network includes a network energy function representing network energy consumed by the plurality of neurons and a neuromorphic framework. The neuromorphic framework minimizes network energy consumed by the plurality of neurons to determine the extrinsic energy constraint, models synaptic connections among the plurality of neurons as respective transconductances that regulate magnitude of spiking currents received from each of the plurality of neurons by each other of the plurality of neurons, and encodes the received electrical current stimulus in corresponding continuous-valued membrane potentials of the plurality of neurons.

20 Claims, 34 Drawing Sheets

(51) Int. Cl.
*G06N 3/065* (2023.01)
*G06N 3/086* (2023.01)

(56) References Cited

U.S. PATENT DOCUMENTS

| | | | | |
|---|---|---|---|---|
| 9,953,261 | B2 | 4/2018 | Friedman et al. | |
| 10,586,147 | B2 | 3/2020 | Wu et al. | |
| 10,671,912 | B2 | 6/2020 | Gottfried et al. | |
| 10,679,118 | B2 | 6/2020 | Lin et al. | |
| 2004/0181261 | A1* | 9/2004 | Manne | A61N 2/02 607/39 |
| 2006/0145581 | A1* | 7/2006 | Ito | H01J 31/123 313/292 |
| 2014/0012789 | A1* | 1/2014 | Bazhenov | G06N 3/088 706/25 |
| 2014/0032458 | A1* | 1/2014 | Sinyavskiy | G06N 3/049 706/16 |
| 2014/0058483 | A1* | 2/2014 | Zao | A61N 5/06 607/88 |
| 2014/0081895 | A1* | 3/2014 | Coenen | G06N 3/049 706/25 |
| 2015/0170028 | A1* | 6/2015 | Gupta | G06N 3/049 706/20 |
| 2015/0269485 | A1* | 9/2015 | Julian | G06N 3/049 706/25 |
| 2016/0379110 | A1* | 12/2016 | Eleftheriou | G06N 3/049 706/33 |
| 2018/0068217 | A1* | 3/2018 | Eleftheriou | G06N 3/049 |
| 2018/0174028 | A1 | 6/2018 | Lin et al. | |
| 2018/0189648 | A1 | 7/2018 | Sengupta et al. | |
| 2018/0322384 | A1 | 11/2018 | Augustine et al. | |
| 2018/0330228 | A1* | 11/2018 | Koelmans | G06N 3/088 |
| 2019/0102669 | A1 | 4/2019 | Chen et al. | |
| 2019/0294980 | A1* | 9/2019 | Laukien | G06N 3/049 |
| 2019/0354845 | A1 | 11/2019 | Yasuda et al. | |
| 2020/0143229 | A1* | 5/2020 | Van Der Made | G06N 3/045 |
| 2020/0184325 | A1* | 6/2020 | Moraitis | G06N 3/0499 |

OTHER PUBLICATIONS

Chakrabartty et al., Extended Polynomial Growth Transforms for Design and Training of Generalized Support Vector Machines, May 2018, 14 pages (Year: 2018).*

Gangopadhyay etal., Spiking, Bursting, and Population Dynamics in a Network of Growth Transform Neurons, 2017, 13 pages (Year: 2017).*

Hiratani et al., Interplay between Short- and Long-Term Plasticity in Cell-Assembly Formation, Jul. 2014, 16 pages (Year: 2014).*

* cited by examiner

METHOD FOR DESIGNING SCALABLE AND ENERGY-EFFICIENT ANALOG NEUROMORPHIC PROCESSORS

CROSS-REFERENCE TO RELATED APPLICATIONS

This application claims the benefit of priority to U.S. Provisional Patent Application No. 62/865,703 filed Jun. 24, 2019, and titled "Method for Designing Scalable and Energy-efficient Analog Neuromorphic Processors," the entire contents of which are hereby incorporated by reference herein.

FIELD

The present disclosure and attachments hereto generally relate to neural networks. Among the various aspects of the present disclosure is the provision of a neuromorphic and deep-learning system.

BACKGROUND

A single action potential generated by a biological neuron is not optimized for energy and consumes significantly more power than an equivalent floating-point operation in a graphics processing unit (GPU) or, for example, a Tensor processing unit (TPU). However, a population of coupled neurons in the human brain, using around 100 Giga coarse neural spikes or operations, can learn and implement diverse functions compared to an application-specific deep-learning platform that typically use around 1 Peta 8-bit/16-bit floating-point operations or more. Furthermore, unlike many deep-learning processors, learning in biological networks occurs in real-time and with no clear separation between training and inference phases. As a result, biological networks as small as a fly brain and, with less than a million neurons, can achieve a large functional and learning diversity at remarkable levels of energy-efficiency. Comparable silicon implementations are orders of magnitude less efficient both in terms of energy-dissipation and functional diversity.

In neuromorphic engineering, neural populations are generally modeled in a bottom-up manner, where individual neuron models are connected through synapses to form large-scale spiking networks. Alternatively, a top-down approach treats the process of spike generation and neural representation of excitation in the context of minimizing some measure of network energy. However, these approaches typically define the energy functional in terms of some statistical measure of spiking activity, such as firing rates, which does not allow independent control and optimization of neurodynamical parameters. A spiking neuron and population model where the dynamical and spiking responses of neurons that can be derived directly from a network objective or energy functional of continuous-valued neural variables like the membrane potential would provide numerous advantages.

BRIEF DESCRIPTION

In one aspect, a spiking neural network including a plurality of neurons implemented in respective circuits. Each neuron is configured to produce a continuous-valued membrane potential according to a Growth Transform bounded by an extrinsic energy constraint. The continuous-valued membrane potential is defined as a function of spiking current received from another neuron in the plurality of neurons, and a received electrical current stimulus. Each neuron is further configured to include a network energy function representing network energy consumed by the plurality of neurons. The spiking neural network includes a neuromorphic framework configured to minimize network energy consumed by the plurality of neurons to determine the extrinsic energy constraint, model synaptic connections among the plurality of neurons as respective transconductances that regulate magnitude of spiking currents received from each of the plurality of neurons by each other of the plurality of neurons, and encode the received electrical current stimulus in corresponding continuous-valued membrane potentials of the plurality of neurons.

In another aspect, a method of operating a neural network is described. The method includes implementing a plurality of neurons in respective circuits, producing a continuous-valued membrane potential according to a Growth Transform bounded by an extrinsic energy constraint, defining a function of spiking current received from another neuron in the plurality of neurons, and a received electrical current stimulus, as a continuous-valued membrane potential, representing network energy consumed by the plurality of neurons as a network energy function, minimizing network energy consumed by the plurality of neurons to determine the extrinsic energy constraint, modeling synaptic connections among the plurality of neurons as respective transconductances that regulate magnitude of spiking currents received from each of the plurality of neurons by each other of the plurality of neurons, and encoding the received electrical current stimulus in corresponding continuous-valued membrane potentials of the plurality of neurons.

In yet another aspect, at least one non-transitory computer-readable storage medium having computer-executable instructions embodied thereon for operating a neural network is described. When executed by at least one processor, the computer-executable instructions cause the processor to implement a plurality of neurons in respective circuits, produce a continuous-valued membrane potential according to a Growth Transform bounded by an extrinsic energy constraint, define a function of spiking current received from another neuron in the plurality of neurons, and a received electrical current stimulus, as a continuous-valued membrane potential, represent network energy consumed by the plurality of neurons as a network energy function, minimize network energy consumed by the plurality of neurons to determine the extrinsic energy constraint, model synaptic connections among the plurality of neurons as respective transconductances that regulate magnitude of spiking currents received from each of the plurality of neurons by each other of the plurality of neurons, and encode the received electrical current stimulus in corresponding continuous-valued membrane potentials of the plurality of neurons.

DETAILED DESCRIPTION

Figure 1:
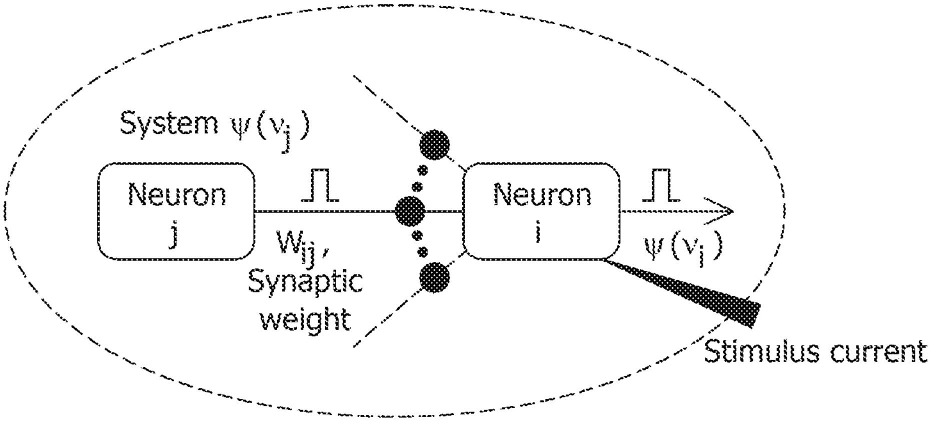
FIG. 1 is a general model of a spiking neural network.

Spiking neural networks that emulate biological neural networks are often modeled as a set of differential equations that govern temporal evolution of its state variables, i.e., neuro-dynamical parameters such as membrane potential and the conductances of ion channels that mediate changes in the membrane potential via flux of ions across the cell membrane. The neuron model is then implemented, for example, in a silicon-based circuit and connected to numerous other neurons via synapses to form a spiking neural network. This design approach is sometimes referred to as a "bottom-up" design that, consequently, does not optimize network energy.

The disclosed spiking neural network utilizes a "top-down" design approach under which the process of spike generation and neural representation of excitation is defined in terms of minimizing some measure of network energy, e.g., total extrinsic power that is a combination of power dissipation in coupling between neurons, power injected to or extracted from the system as a result of external stimulation, and power dissipated due to neural responses. The network energy function, or objective, is implemented at a network level in a population model with a neuromorphic framework. The top-down design accurately emulates a biological network that tends to self-optimize to a minimum-energy state at a network level.

Top-down designs are typically implemented as a digital, or binary, system in which the state a neuron is, for example, spiking or not spiking. Such designs generally lack the ability to effectively control various neuro-dynamical parameters, such as, for example, the shape of the action potential, bursting activity, or adaptation in neural activity without affecting the network solution. The disclosed neuron model utilizes analog connections that enable continuous-valued variables, such as membrane potential. Each neuron is implemented as an asynchronous mapping based on polynomial Growth Transforms that are fixed-point algorithms for optimizing polynomial functions under linear or bound constraints. The disclosed Growth Transform neurons (GT neurons) can solve binary classification tasks while producing stable and unique neural dynamics (e.g., noise-shaping, spiking, and bursting) that can be interpreted using a classification margin. In certain embodiments, all neuro-dynamical properties are encoded at a network level in the network energy function. Alternatively, at least some of the neuro-dynamical properties are implemented within a given GT neuron.

In the disclosed neuromorphic framework, the synaptic interactions, or connections, in the spiking neural network are mapped such that the network solution, or steady-state attractor, is encoded as a first-order condition of an optimization problem, e.g., network energy minimization. The disclosed GT neurons and, more specifically, their state variables evolve stably in a constrained manner based on the bounds set by the network energy minimization, thereby reducing network energy relative to, for example, bottom-up synaptic mapping. The disclosed neuromorphic framework integrates learning and inference using a combination of short-term and long-term population dynamics of spiking neurons. Stimuli are encoded as high-dimensional trajectories that are adapted, over the course of real-time learning, according to an underlying optimization problem, e.g., minimizing network energy.

In certain embodiments, gradient discontinuities are introduced to the network energy function to modulate the shape of the action potential while maintaining the local convexity and the location of the steady-state attractor (i.e., the network solution). The disclosed GT neuron model is generalized to a continuous-time dynamical system that enables such modulation of spiking dynamics and population dynamics for certain neurons or regions of neurons without affecting network convergence toward the steady-state attractor. The disclosed neuromorphic framework and GT neuron model enable implementation of a spiking neural network that exhibits memory, global adaptation, and other useful population dynamics. Moreover, by decoupling spiking dynamics from the network solution (via the top-down design) and by controlling spike shapes, the disclosed neuromorphic framework and GT neuron model enable a spiking associative memory network that can recall a large number of patterns with high accuracy and with fewer spikes than traditional associative memory networks.

FIG. 1 is a diagram of a conventional spiking neuron model. In spiking neuron model the membrane potential is defined (in EQ. 1) as a function of a post-synaptic response to pre-synaptic input spikes, external driving currents, and the shape of the spike. In certain implementations, spike shape is generally ignored and the membrane potential is a linear post-synaptic integration of input spikes and external currents. Membrane potential $v_i \in \mathbb{R}$ represents the inter-cellular membrane potential corresponding to neuron i in a network of M Neurons. The i-th neuron receives spikes from the j-th neuron that are modulated by a synapse having a strength, or weight, denoted by $W_{ij} \in \mathbb{R}$. Assuming the synaptic weights are constant, EQ. 1 below represents discrete-time temporal dynamics of membrane potential.

$$v_{i,n+1} = \gamma v_{i,n} + \sum_{j=1}^{M} W_{i,j}\Psi(v_{j,n}) + y_{i,n},\ \forall\, i = 1, \ldots , M, \quad \text{EQ. 1}$$

where $v_{i,n} \equiv v_i(n\Delta t)$ and $v_{i,n+1} \equiv v_i((n+1)\Delta t)$, $\Delta t$ is the time increment between time steps, $y_{i,n}$ represents the depolarization due to an external stimulus that can be viewed as $y_{i,n}=R_{m_i} I_{i,n}$, where $I_{i,n} \in \mathbb{R}$ is the current stimulus at the n-th time-step and $R_{m_i} \in \mathbb{R}$ is the membrane resistance of the i-th neuron, $\gamma$ is a leakage factor defined as $0 \leq \gamma \leq 1$, and $\Psi(\ )$ is a simple spiking function that is positive only when the membrane potential exceeds a threshold and zero otherwise. Generally, a post-synaptic neuron i receives electrical input from a pre-synaptic neuron j in the form of the spiking function, which is defined in terms of the membrane potential of the pre-synaptic neuron j.

Figure 2:
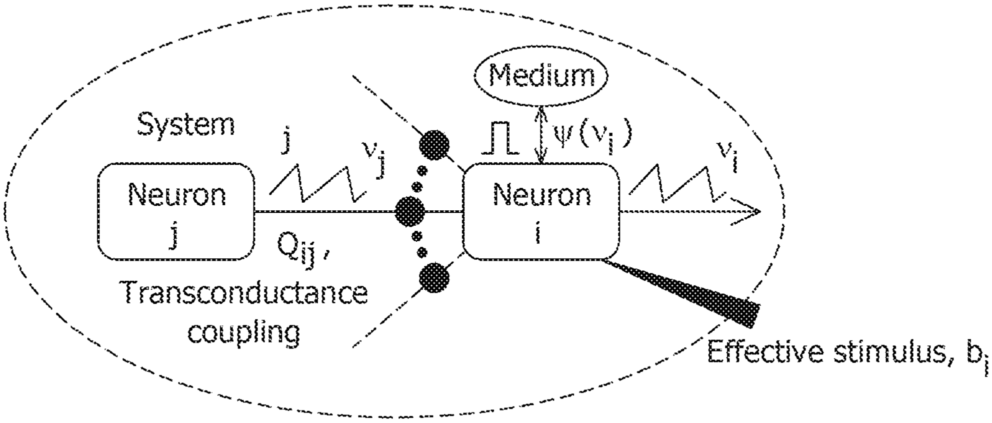
FIG. 2 is a compartmental network model obtained after remapping synaptic interactions.

FIG. 2 is a diagram of a GT neuron model. In GT neuron model, membrane potential is bounded by v in that $|v_{i,n}| \leq v_c$, similar to biological neural networks where membrane potentials are also bounded. Each post-synaptic neuron i, receives electrical input from at least one pre-synaptic neuron j, through a synapse modeled by a transconductance $Q_{ij}$. The analog connection between neuron i, and neuron j, is modulated by transconductance $Q_{ij}$. Neuron i also receives an electrical current stimulus $b_i$, and exchanges voltage-dependent ionic-current with its medium, denoted by $\Psi(v_i)$. Based on these assumptions, the network energy function $\mathcal{H}(\ )$ and the minimization objective are expressed in EQ. 2. The network energy function represents the extrinsic, or metabolic, power supplied to the network, including power dissipation due to coupling between neurons, power injected to or extracted from the system as a result of external stimulation, and power dissipated due to neural responses.

$$\min_{|v_i|\le V_c \forall i} \mathcal{H}(\{v_i\}) = \min_{|v_i|\le V_c \forall i} \frac{1}{2}\sum_{i=1}^{M}\sum_{j=1}^{M} Q_{ij} v_j v_i - \sum_{i=1}^{M} b_i v_i + \sum_{i=1}^{M}\int_{-\infty}^{v_i} \Psi(v)dv \quad \text{EQ. 2}$$

EQ. 2 is derived assuming the spiking function $\Psi(\ )$ is a smooth function of the membrane potential that continuously tracks net electrical input at every instant. For a non-smooth spiking function, the temporal expectation of membrane potential encodes the net electrical input over a sufficiently-large time window. If $\bar{y}_i[n]$ is the empirical expectation of the external input estimated at the n-th time window, and under the boundary constraint for membrane potential, membrane potential can be expressed as:

$$(1-\gamma)\bar{v}_i[n] = \sum_{j=1}^{M} W_{ij}\bar{\Psi}_j[n] + \bar{y}_i[n] \quad \text{EQ. 3}$$

where $$\bar{\Psi}_j[n] = \lim_{N\to\infty} \sum_{p=n-N+1}^{n} \Psi(v_{j,p}).$$

can be further reduced to a matrix expression:

$$(1-\gamma)\bar{v}[n] = W\bar{\Psi}[n] + \bar{y}[n] \quad \text{EQ. 4}$$

where $\bar{v}[n]\in\mathbb{R}^M$ is the vector of mean membrane potentials for a network of M neurons, $W\in\mathbb{R}^M\times\mathbb{R}^M$ is the synaptic weight matrix for the network, $\bar{y}[n]\in\mathbb{R}^M$ is the vector of mean external inputs for the n-th time window and $\bar{\Psi}[n]=[\bar{\Psi}_1[n], \bar{\Psi}_2[n], \ldots, \bar{\Psi}_M[n]]^T$ is the vector of mean spike currents. Because the spiking function is a non-linear function of the membrane potential, the exact network energy functional is difficult to derive. However, under the assumption that synaptic weight matrix W is invertible, EQ. 4 can be simplified to:

$$\bar{\Psi}[n] = (1-\gamma)W^{-1}\bar{v}[n] - W^{-1}\bar{y}[n] \quad \text{EQ. 5}$$

$$\bar{\Psi}[n] = -Q\bar{v}[n] + \bar{b}[n] \quad \text{EQ. 6}$$

Where $Q=-(1-y)W^{-1}$, and $\bar{b}[n]=-W^{-1}\bar{y}[n]$ is the effective external current stimulus. If the synaptic weight matrix W is not invertible, $W^{-1}$ represents a pseudo-inverse. The spiking function for the i-th neuron, subject to the bound constraint $|v_{i,n}|\le v_c$ $\forall$i, n is then expressed as:

$$\bar{\Psi}_i[n] = -\sum_{j=1}^{M} Q_{ij}\bar{v}_j[n] + \bar{b}_i[n] \quad \text{EQ. 7}$$

The result of optimizing, i.e., minimizing, the energy function in EQ. 2 is an asymptotic first-order condition corresponding to a typical input/output response of a neural network with a non-linearity represented by $\Psi^{-1}(\ )$. A modulation function controls the rate of convergence to the first-order condition, but does not affect the final steady-state solution. The modulation function enables control of the network spiking rate and, consequently, the network energy independent of the network learning task. The energy minimization problem represented in EQ. 2 is solved, under the constraint of $v_c$, using a dynamical system based on polynomial Growth Transforms. Growth Transforms are multiplicative updates derived from the Baum-Eagon inequality that optimizes a Lipschitz continuous cost function under linear or bound constraints on the optimization variables. Each neuron in the network implements a continuous mapping based on Growth Transforms, ensuring the network evolves over time to reach an optimal solution of the energy functional within the constraint manifold. The Growth Transform dynamical system is represented by the system equation:

$$v_{i,n+1} \leftarrow v_c \frac{-\frac{\partial\mathcal{H}}{\partial v_{i,n}} v_c + \lambda v_{i,n}}{-\frac{\partial\mathcal{H}}{\partial v_{i,n}} v_{i,n} + \lambda v_c}, \; i=1, \ldots, M \quad \text{EQ. 8}$$

Where EQ. 8 satisfies the following constraints for all time-indices n: (a) $|v_{i,n}|\le v_c$, (b) $\mathcal{H}(\{v_{i,n+1}\})\le\mathcal{H}(\{v_{i,n}\})$ in mains where $$\frac{\partial\mathcal{H}}{\partial v_{i,n}}$$

is continuous, and (c) $\lim_{n\to\infty}(\mathbb{E}_N(z_i[n]))\to 0$ $\forall$i, n where $$z_i = (v_c^2 - v_{i,n}v_{i,n+1})\frac{\partial\mathcal{H}}{\partial v_{i,n}};$$

where $\mathbb{R}^M\to\mathbb{R}$ is a function of $v_i$, i=1, . . . , M with bounded partial derivatives; and where $$\lambda > \left|\frac{\partial\mathcal{H}}{\partial v_{i,n}}\right|$$

$\forall$i, n is a parameter; and where the initial condition for the dynamical system satisfies $|v_{i,0}|\le v_c$ $\forall$i.

In the n-th iteration of EQ. 8, as the n-th time step for the neuron i EQ. 8 can be expressed in terms of the objective function for the neuron model, the network energy function shown in EQ. 2:

$$\frac{\partial\mathcal{H}}{\partial v_{i,n}} = \sum_{j=1}^{M} Q_{ij} v_{j,n} - b_{i,n} + \Psi(v_{i,n}) \quad \text{EQ. 9}$$

The dynamics resulting from EQ. 8 for a barrier function $\Psi(\ )=0$, and because the energy function is a smooth function, the neural variables $v_{i,n}$ converge to a local minimum, such that $$\lim_{n\to\infty} v_{i,n} = v_i^*.$$

. Accordingly, the third constraint (c) on the dynamical system in EQ. 8 can be expressed as:

$$\left(v_c^2 - v_i^{*2}\right)\frac{\partial\mathcal{H}}{\partial v_{i,n}}\Big|_{v_i^*} \to 0. \quad \text{EQ. 10}$$

Thus, as long as the constraint on membrane potential is enforced, the gradient term tends to zero, ensuring the dynamical system converges to the optimal solution within the domain defined by the bound constraints. The dynamical system represented by EQ. 8 ensures the steady-state neural responses, i.e., the membrane potentials, are maintained below $v_c$. In the absence of the barrier term, the membrane potentials can converge to any value between $-v_c$ and $+v_c$ based on the effective inputs to individual neurons.

Figure 3A:
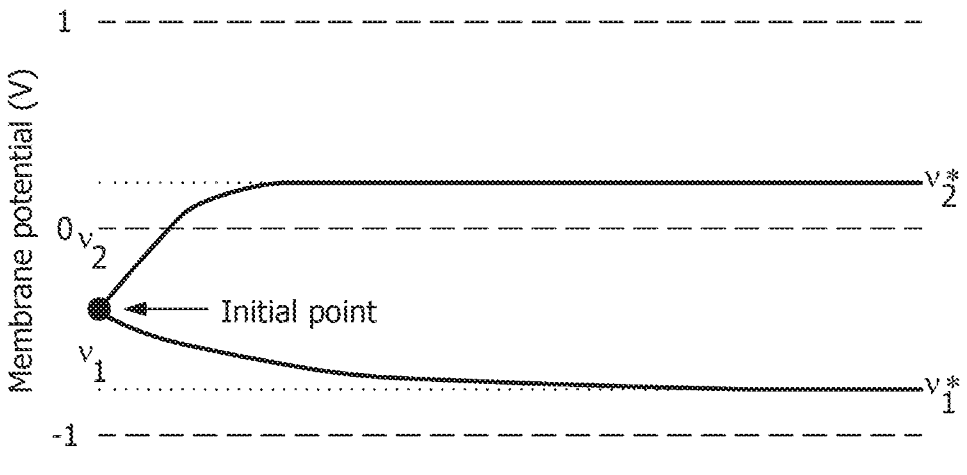
FIG. 3A is a 2-neuron network in absence of a barrier function showing bounding dynamics.
Figure 3B:
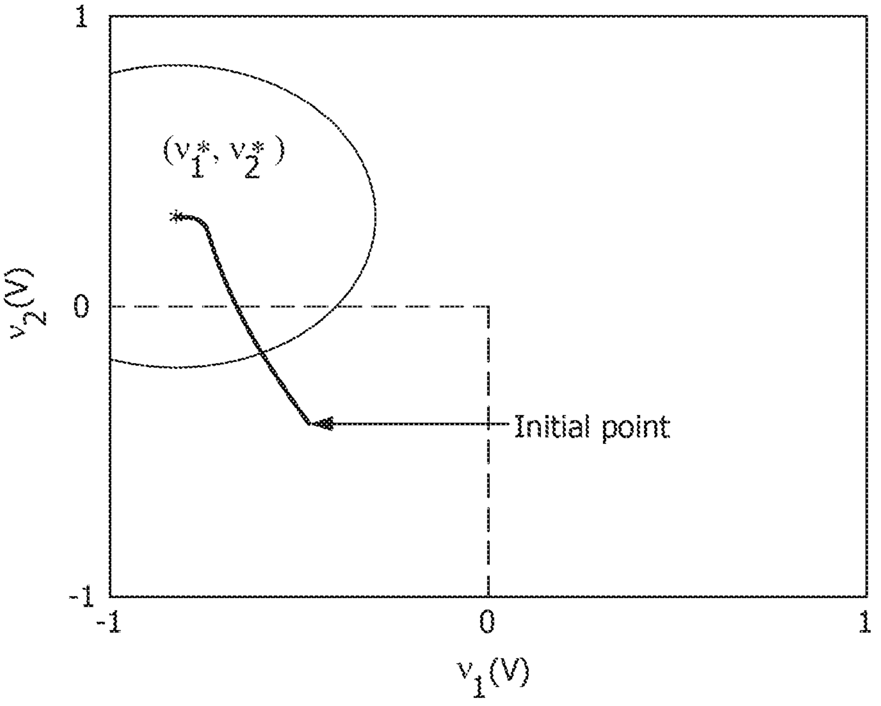
FIG. 3B is a corresponding contour plot showing convergence of the membrane potentials in the presence of external stimulus.
Figure 3C:
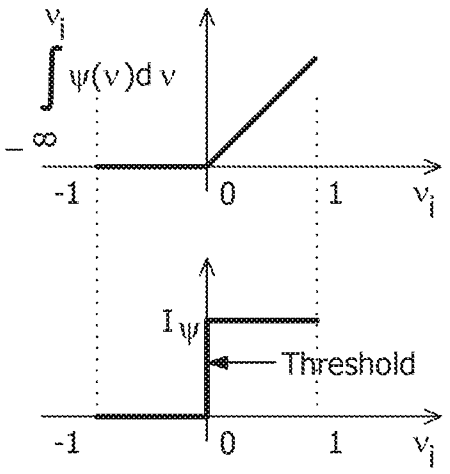
FIG. 3C is a function $\int\Psi(.)dv$ and its derivative $\Psi(.)$ used for a spiking neuron model.

FIG. 3A illustrates membrane potentials for two neurons where conductances are implemented as an identity matrix Q, and where membrane potentials are normalized to a $v_c=1$V, and a threshold voltage of zero volts. Referring to FIG. 3A, membrane potential for one neuron, $$v_1^*,$$

is hyperpolarized due to a negative stimulus, and membrane potential for the second neuron, $$v_2^*,$$

is depolarized beyond the threshold. FIG. 3B illustrates the corresponding energy contours, where the steady-state neural responses encode the optimal solution of the energy function. The dynamical system can then be extended to a spiking neuron model when the trans-membrane current in the compartmental model shown in EQ. 2 is approximated by a discontinuous spiking function $\Psi(\ )$. In general, a penalty function is selected in terms of the spiking function to be convex, e.g., $$R(v_i) = \int_{-\infty}^{v_i} \Psi(v)dv,$$

where $R(v_i>0V)>0$ W and $R(v_i\leq 0V)=0$ W. FIG. 3C illustrates the penalty function $R(v_i)$ and the spiking function $\Psi(\ )$ with a gradient discontinuity at a threshold of $v_i=0$V at which the neuron generates an action potential. The spiking function is given by:

$$\Psi(v_{i,n}) = \begin{cases} I_\Psi A; & v_{i,n} > 0\ \text{V} \\ 0A; & v_{i,n} \leq 0\ \text{V} \end{cases}. \quad \text{EQ. 11}$$

Figure 3D:
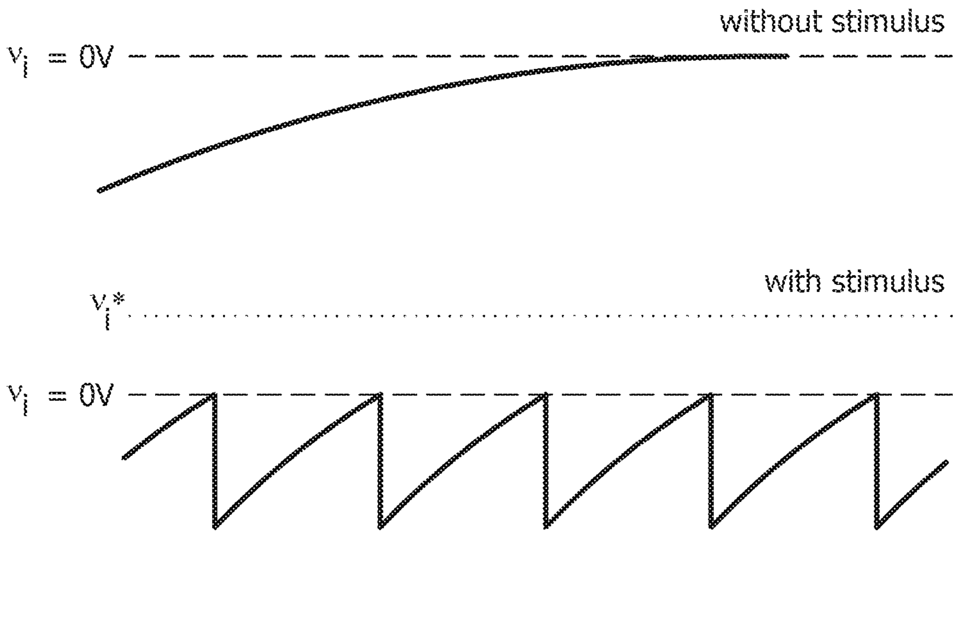
FIG. 3D is a time-evolution of the membrane potential $v_i$ of a single neuron in the spiking model in the absence and presence of external stimulus.

FIG. 3D shows the time-evolution of the membrane potential of a single neuron in the spiking model in the absence and presence of external stimulus. When there is no external stimulus, the neuron response converges to zero volts, i.e., non-spiking. When a positive stimulus is applied, the optimal solution for membrane potential shifts upward to a level that is a function of the stimulus magnitude. A penalty term $R(v_i)$ works as a barrier function, penalizing the energy functional whenever $v_i$ exceeds the threshold, thereby forcing $v_i$ to reset below the threshold. The stimulus and the barrier function therefore introduce opposing tendencies, making $v_i$ oscillate back and forth around the discontinuity as long as the stimulus is present. Thus when $\Psi(.)$ is introduced, the potential $v_{i,n}$ switches when $\Psi(v_{i,n})>0$ A or only when $v_{i,n}>0$ V. However, the dynamics of $v_{i,n}$ remains unaffected for $v_{i,n}<0$ V. During the brief period when $v_{i,n}>0$ V, it is assumed that the neuron enters into a runaway state leading to a voltage spike.

Figure 3E:
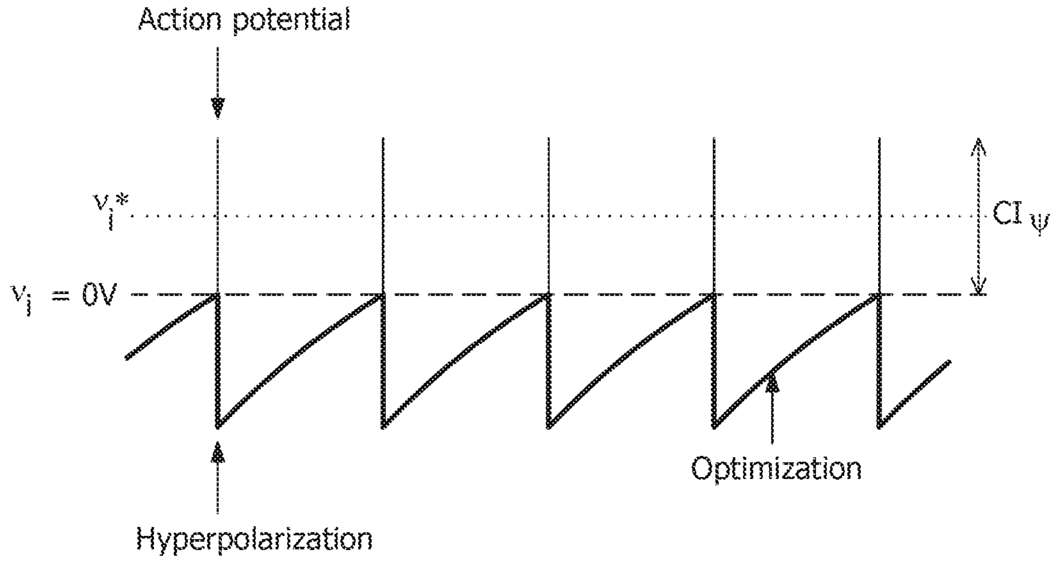
FIG. 3E is a composite signal upon addition of spikes when $v_i$ crosses a threshold.

FIG. 3E shows a composite signal upon addition of spikes when $v_i$ crosses the threshold. The composite spike signal $s_{i,n}$, is then treated as a combination of the sub-threshold and supra-threshold responses and is given by:

$$S_{i,n} = v_{i,n} + C\Psi(v_{i,n}) \quad \text{EQ. 12}$$

where the trans-impedance parameter $C>0\Omega$ determines the magnitude of the spike and incorporates the hyperpolarization part of the spike as a result of $v_i$ oscillating around the gradient discontinuity. Thus, a refractory period is automatically incorporated in between two spikes.

Figure 3F:
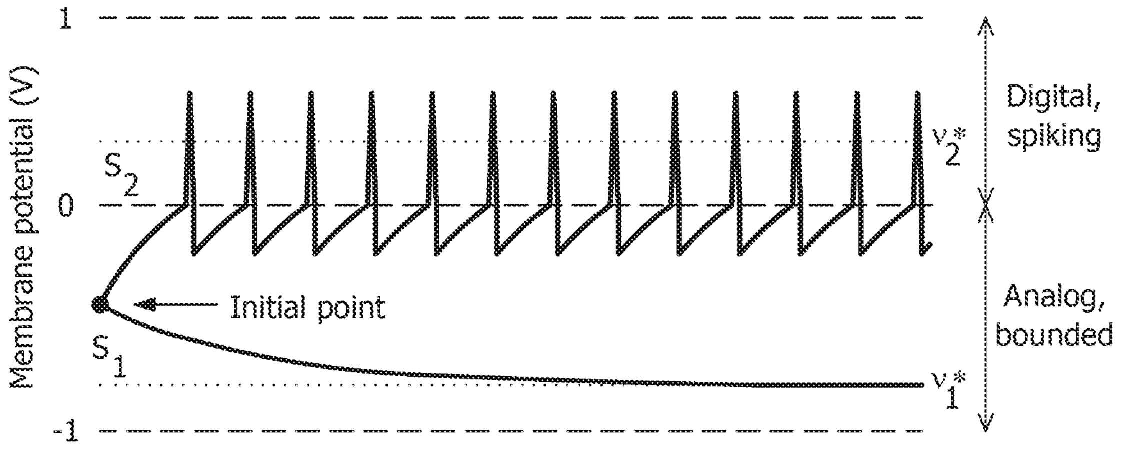
FIG. 3F is a 2-neuron network in presence of the barrier function showing bounding dynamics.
Figure 3G:
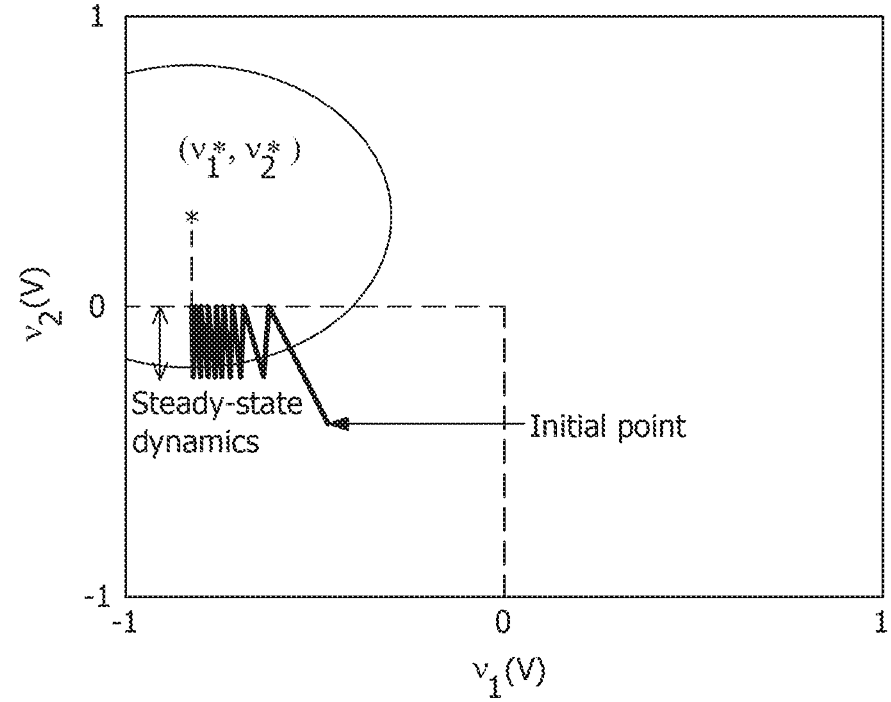
FIG. 3G is a contour plot showing steady-state dynamics of membrane potentials in the presence of external stimulus.

FIG. 3F shows bounded and spiking dynamics in the same 2-neuron network in presence of barrier function. FIG. 3G shows corresponding contour plot showing steady-state dynamics of the membrane potentials in the presence of external stimulus. In order to show the effect of $\Psi(.)$ on the nature of the solution, FIG. 3F and FIG. 3G are plotted for the neural responses and contour plots for the 2-neuron network in FIG. 3A and FIG. 3B for the same set of inputs. FIG. 3F and FIG. 3G consider the case when the barrier function is present. The penalty function produces a barrier at the thresholds, which are indicated by red dashed lines, and transforms the time-evolution of $s_2$ into a digital, spiking mode, where the firing rate is determined by the extent to which the neuron is depolarized. It can be seen from the neural trajectories in FIG. 3G and EG. 2 that $\Psi(.)>0$ behaves as a Lagrange parameter corresponding to the spiking threshold constraint $v_{i,n}<0$. For non-pathological cases, it can be shown that for spiking neurons or for neurons whose membrane potentials $v_{i,n}>-v_c$ $\forall$n, $$\lim_{N\to\infty}\left((E_n)\left(\frac{\partial\mathcal{H}}{\partial v_{i,n}}[n]\right)\right) = 0, \quad \text{EQ. 13}$$

This implies that asymptotically the network exhibits limit-cycles about a single attractor or a fixed-point such that the time-expectations of its state variables encode this optimal solution. A similar stochastic first-order framework was used to derive a dynamical system corresponding to ΣΔ modulation for tracking low-dimensional manifolds embedded in high-dimensional analog signal spaces. Combining EQ. 9 and EQ. 13 becomes $$\sum_{j=1}^{M} Q_{ij}\overline{v}_j[n] - \overline{b}_i[n] + \overline{\Psi}_i[n] = 0, \quad \text{EQ. 14}$$

$$\text{where } \overline{\Psi}_i[n] = \lim_{N\to\infty} \frac{1}{N}\sum_{p=n-N+1}^{N} \Psi(v_{i,p}). \quad \text{EQ. 15}$$

Rearranging the terms in EQ. 14, EQ. 7 is obtained. The penalty function $R(v_i)$ in the network energy functional in effect models the power dissipation due to spiking activity. For the form of R(.), the power dissipation due to spiking is taken to be zero below the threshold, and increases linearly above threshold.

Figure 3H:
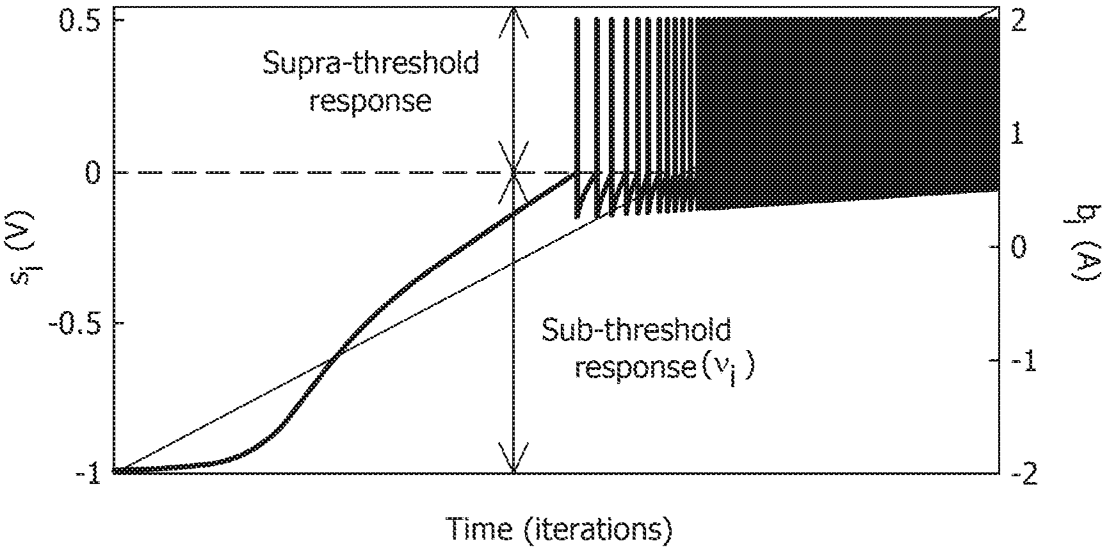
FIG. 3H is a plot of composite spike signal $s_i$ of a spiking neuron model when the external current stimulus is increased.
Figure 3I:
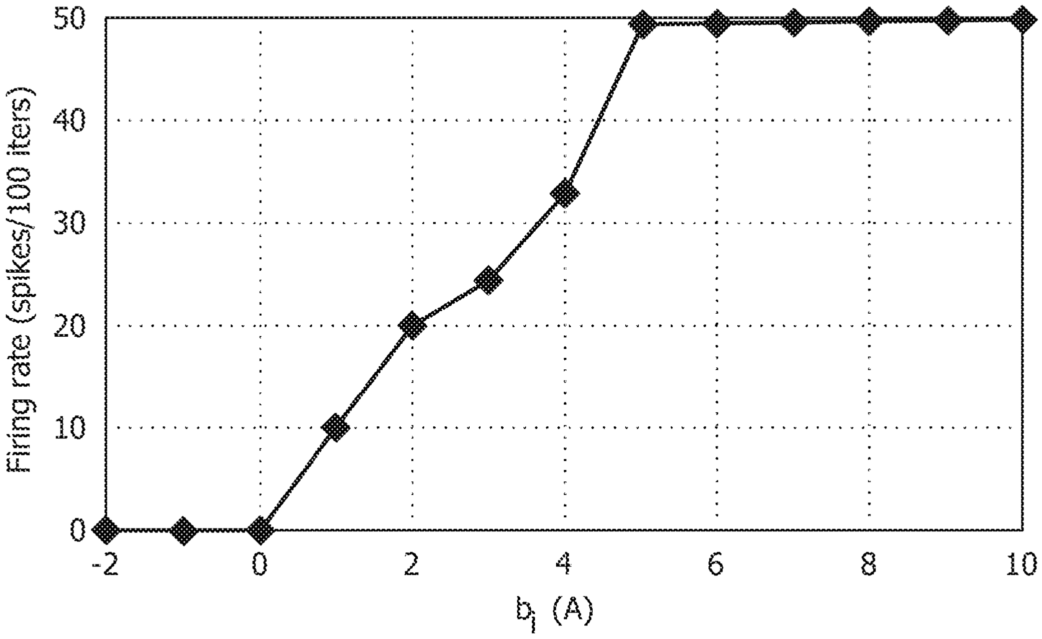
FIG. 3I is a spiking neuron model's input-output characteristics.

FIG. 3H shows a plot of composite spike signal $s_i$ of the spiking neuron model when the external current stimulus is increased. The plot of the composite spike signal is for a ramp input for the spiking neuron model. As $v_{i,n}$ exceeds the threshold for a positive stimulus, the neuron enters a spiking regime and the firing rate increases with the input, whereas the sub-threshold response is similar to the non-spiking case. FIG. 3I shows input-output characteristics for the spiking model through the tuning curve for the neuron as the input stimulus is increased. It is nearly sigmoidal in shape and shows how the firing rate reaches a saturation level for relatively high inputs. The spiking neuron model is based on a discrete-time Growth Transform dynamical system.

The penalty term $R(v_i)$ of the form presented above works analogous to a barrier function, penalizing the energy functional whenever $v_{i,n}$ exceeds the threshold. This transforms the time-evolution of $v_{i,n}$ into a spiking mode above the threshold, while keeping the sub-threshold dynamics similar to the non-spiking case. The Growth Transform dynamical system ensures that the membrane potentials are bounded, thereby implementing a squashing or compressive function on the neural responses. How the model encodes external stimulus as a combination of spiking and bounded dynamics is described here. The average spiking activity of the i-th neuron encodes the error between the average input and the weighted sum of membrane potentials. For a single, uncoupled neuron where $$Q_{ij} = \begin{cases} Q_0\Omega^{-1}; & \forall\, i = j \\ 0\Omega^{-1}; & \forall\, i \neq j \end{cases}, \quad \text{EQ. 16}$$

there is $$\overline{\Psi}_i[n] + Q_0\overline{v}_i[n] = \overline{b}_i[n]. \quad \text{EQ. 17}$$

Multiplying EQ. 17 on both sides by C Ω, where $$C = \frac{1}{Q_0},$$

it becomes $$C\overline{\Psi}_i[n] + \overline{v}_i[n] = C\overline{b}_i[n] \text{ or,} \quad \text{EQ. 18}$$

$$s_i[n] = C\overline{b}_i[n], \quad \text{EQ. 19}$$

where the EQ. 12 has been used.

EQ. 19 indicates that through a suitable choice of the trans-impedance parameter C, the sum of sub-threshold and supra-threshold responses encodes the external input to the neuron. This is also the rationale behind adding a spike to the sub-threshold response $v_{i,n}$, as illustrated in FIG. 3E, to yield the composite neural response. If $Q_0=0\ \Omega^{-1}$, then $$\overline{\Psi}_i[n] = \overline{b}_i[n], \quad \text{EQ. 20}$$

where the average spiking activity tracks the stimulus. Thus, by defining the coupling matrix in various ways, different encoding schemes for the network can be obtained.

The remapping from standard coupled conditions of a spiking neural network to the proposed formulation admits a geometric interpretation of neural dynamics. It may be shown that the activity of individual neurons in a network can be visualized with respect to a network hyper-plane. This geometric interpretation can then be used to understand network dynamics in response to different stimuli. Like a Hessian, if it is assumed that the matrix Q is positive-definite about a local attractor, there exists a set of vectors $x_i \in \mathbb{R}^D$, $i=1, \ldots, M$ such that each of the elements $Q_{ij}$ can be written as an inner product between two vectors as $Q_{ij}=x_i.x_j$, $1\le i, j\le M$. This is similar to kernel methods that compute similarity functions between pairs of vectors in the context of support vector machines. This associates the i-th neuron in the network with a vector $x_i$, mapping it onto an abstract metric space $\mathbb{R}^D$ and essentially providing an alternate geometric representation of the neural network. From EQ. 14, the spiking activity of the i-th neuron for the n-th time-window can then be represented as $$\begin{aligned}\overline{\Psi}_i[n] &= -\sum_{j=1}^{M} Q_{ij}\overline{v}_j[n] + \overline{b}_i[n] \\ &= \sum_{j=1}^{M} -(x_i \cdot x_j)\overline{v}_j[n] + \overline{b}_i[n], \\ &= w_n \cdot x_i + \overline{b}_i[n]\end{aligned} \quad \text{EQ. 21}$$

$$\text{where } w_n = -\sum_{j=1}^{M} x_j\overline{v}_j[n]. \quad \text{EQ. 22}$$

$\Psi$ therefore represents the distance of the vector $x_i$ from a network hyperplane in the D-dimensional vector space, which is parameterized by the weight vector $w_n$ and offset $\overline{b}_i[n]$. When a stimulus $\overline{b}_i[n]$ is applied, the hyperplane shifts, leading to a stimulus-specific value of this distance for each neuron that is also dependent on the network configuration Q. Hence, Ψ(.) is denoted as a "network variable," that signifies how the response of each neuron is connected to the rest of the network. Note that the elements of the coupling matrix may be written in a kernelized form as $Q_{ij}=K(x_i).K(x_j)$, where K(.) is a non-linear transformation function, defining a non-linear boundary for each neuron. A dynamic and stimulus-specific hyperplane offers intuitive interpretations about several population dynamics.

Single neurons show a vast repertoire of response characteristics and dynamical properties that lend richness to their computational properties at the network level. The proposed model may be extended into a continuous-time dynamical system, which enables it to reproduce a vast majority of such dynamics and also allows exploration of interesting properties in coupled networks. The continuous-time version of the dynamical system is derived using a special property of Growth Transforms.

The operation of the proposed neuron model is therefore governed by two sets of dynamics: (a) minimization of the network energy functional H; (b) modulation of the trajectory using a time-constant $\tau_i(t)$, also referred to as modulation function. Fortunately, the evolution of $\tau_i(t)$ can be made as complex as possible without affecting the asymptotic fixed-point solution of the optimization process. It can be a made a function of local variables like $v_i$ and $\dot{v}_i$ or a function of global/network variables like H and $\dot{H}$.

Figure 4:
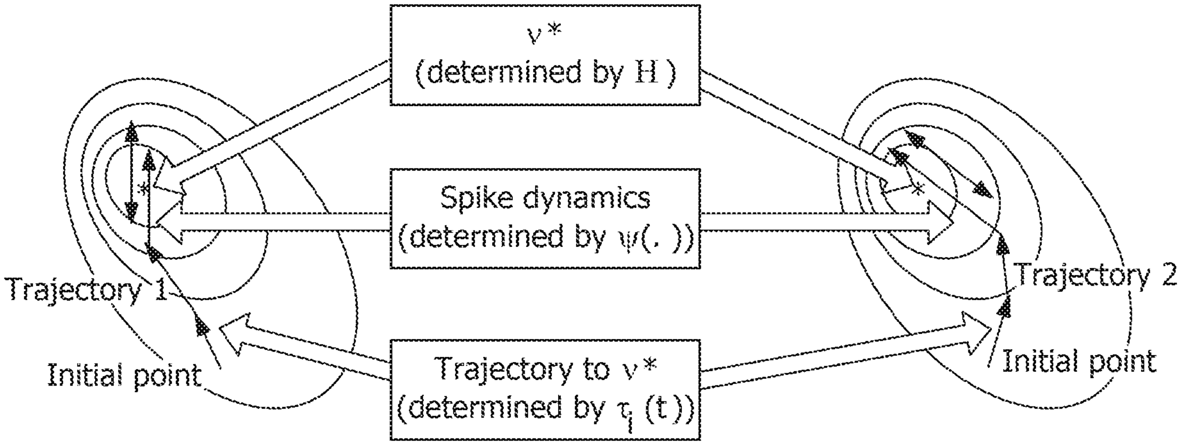
FIG. 4 is a visualization of decoupling of network solution, spike shape and response trajectory using a spiking neuron model.

FIG. 4 shows decoupling of network solution, spike shape, and response trajectory using the proposed model. Different modulation functions lead to different steady-state spiking dynamics under the same energy contour. Different choices of the modulation function leads to different trajectories followed by the neural variables under the same energy contour.

The proposed approach enables decoupling of the three following aspects of the spiking neural network: (a) fixed points of the network energy functional, which depend on the network configuration and external inputs; (b) nature and shape of neural responses, without affecting the network minimum; and (c) spiking statistics and transient neural dynamics at the cellular level, without affecting the network minimum or spike shapes. This makes it possible to independently control and optimize each of these neuro-dynamical properties without affecting the others. The first two aspects arise directly from an appropriate selection of the energy functional and were demonstrated above. Next, it will be shown how the modulation function loosely models cell excitability, and can be varied to tune transient firing statistics based on local and/or global variables. This allows encoding of the same optimal solution using widely different firing patterns across the network to have unique potential benefits for neuromorphic applications.

First, how a number of single-neuron response characteristics can be reproduced by changing the modulation function $\tau_i(t)$ in the neuron model is shown. For this, an uncoupled network is considered, where $$Q_{ij} = \begin{cases} Q_0\Omega^{-1}, & \forall\, i = j \\ 0\Omega^{-1}, & \forall\, i \neq j \end{cases} \qquad \text{EQ. 23}$$

These dynamics may be extended to build coupled networks with properties like memory and global adaptation for energy-efficient neural representation. Results are representative of the types of dynamical properties the proposed model can exhibit, but are by no means exhaustive.

Figure 5A:
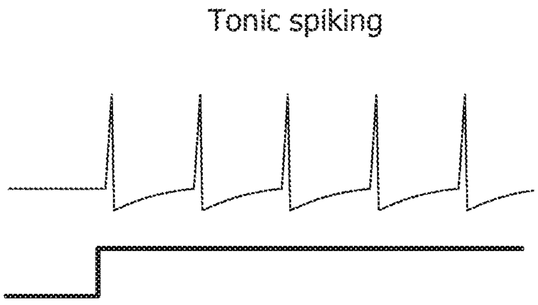
FIG. 5A is a simulation of tonic spiking single-neuron response obtained using a growth-transform neural model.

When stimulated with a constant current stimulus $b_i$, a vast majority of neurons fire single, repetitive action potentials for the duration of the stimulus, with or without adaptation. The proposed model shows tonic spiking without adaptation when the modulation function $\tau_i(t)=\tau$, where $\tau>0$ s. FIGS. 5A-5D show simulations demonstrating different single-neuron responses obtained using the GT neuron model. FIG. 5A illustrates a simulation of tonic spiking response using the neuron model.

Bursting neurons fire discrete groups of spikes interspersed with periods of silence in response to a constant stimulus. Bursting arises from an interplay of fast ionic currents responsible for spiking, and slower intrinsic membrane currents that modulate the spiking activity, causing the neuron to alternate between activity and quiescence. Bursting response can be simulated in the proposed model by modulating $\tau_i(t)$ at a slower rate compared to the generation of action potentials, in the following way:

$$\tau_i(t) = \begin{cases} \tau_1 s, & c_i(t) < B \\ \tau_2 s, & c_i(t) \geq B \end{cases} \qquad \text{EQ. 24}$$

where $\tau_1>\tau_2>0$ s, B is a parameter and the count variable $c_i(t)$ is updated according to $$c_i(t) = \begin{cases} \lim\limits_{\Delta t \to 0} c_i(t-\Delta t) + \mathcal{I}[v_i(t) > 0]), & \lim\limits_{\Delta t \to 0} c_i(t-\Delta t) < B \\ 0, & \lim\limits_{\Delta t \to 0} c_i(t-\Delta t) \geq B \end{cases}, \qquad \text{EQ. 25}$$

Figure 5B:
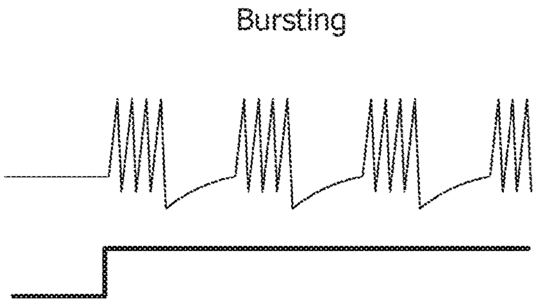
FIG. 5B is simulation of a bursting single-neuron response obtained using a growth-transform neural model.

I[.] being an indicator function. FIG. 5B shows a simulation of a bursting neuron in response to a step input.

Figure 5C:
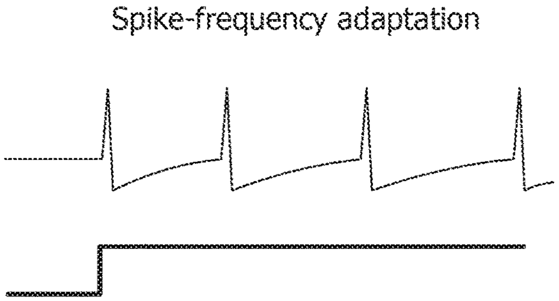
FIG. 5C is a simulation of tonic spiking single-neuron response with a spike-frequency adaptation obtained using a growth-transform neural model.

When presented with a prolonged stimulus of constant amplitude, many cortical cells initially respond with a high-frequency spiking that decays to a lower steady-state frequency. This adaptation in the firing rate is caused by a negative feedback to the cell excitability due to the gradual inactivation of depolarizing currents or activation of slow hyperpolarizing currents upon depolarization, and occur at a time-scale slower than the rate of action potential generation. The spike-frequency adaptation was modeled by varying the modulation function according to $$\tau_i(t) = \tau - 2\phi(h(t) * \Psi(v_i(t))) \qquad \text{EQ. 26}$$

where $h(t)*\Psi(v)(t)$ is a convolution operation between a continuous-time first-order smoothing filter h(t) and the spiking function $\Psi(v_i(t))$, and $$\phi(x) = \tau\left(\frac{1}{1+\exp(x)}\right) \qquad \text{EQ. 27}$$

is a compressive function that ensures $0\leq\tau_i(t)\leq\tau$ s. The parameter $\tau$ determines the steady-state firing rate for a particular stimulus. FIG. 5C shows a tonic-spiking response with spike-frequency adaptation.

Figure 5D:
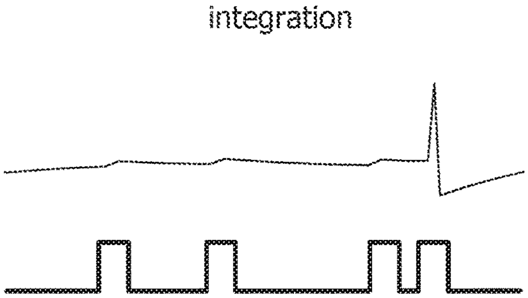
FIG. 5D is a simulation of integrator single-neuron response obtained using a growth-transform neural model.

FIG. 5D shows a leaky integrator when the baseline input is set slightly negative so that the fixed point is below the threshold, and preferentially spiking to high-frequency or closely-spaced input pulses that are more likely to make $v_i$ cross the threshold.

Figure 6A:
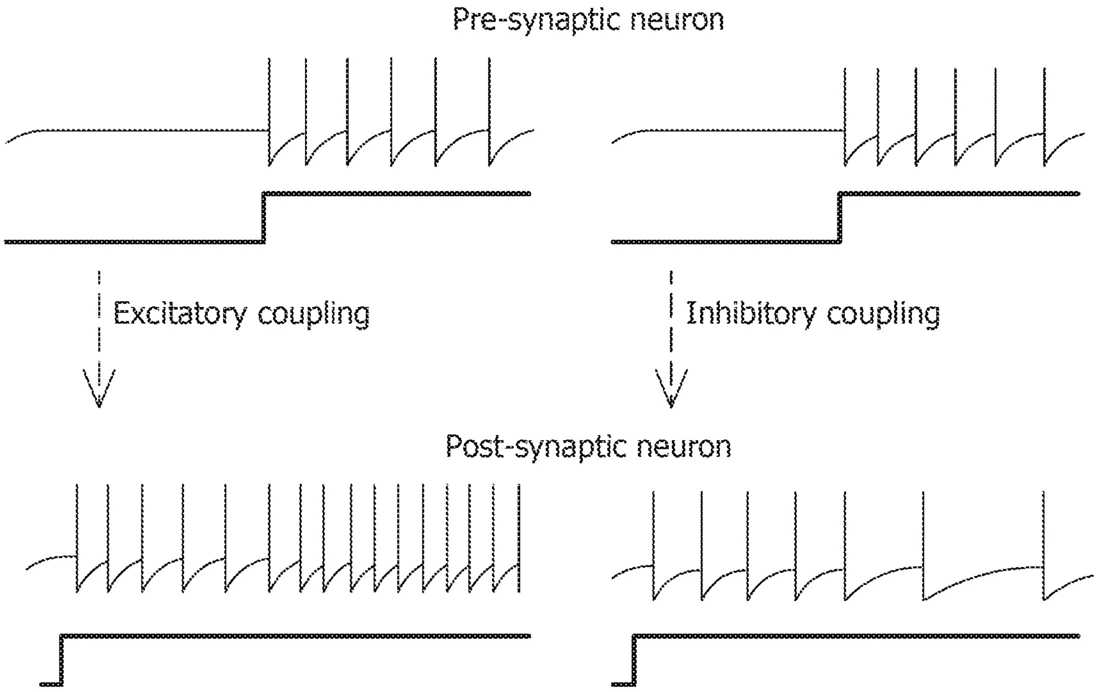
FIG. 6A is a 2-neuron network with excitatory and inhibitory couplings.
Figure 6B:
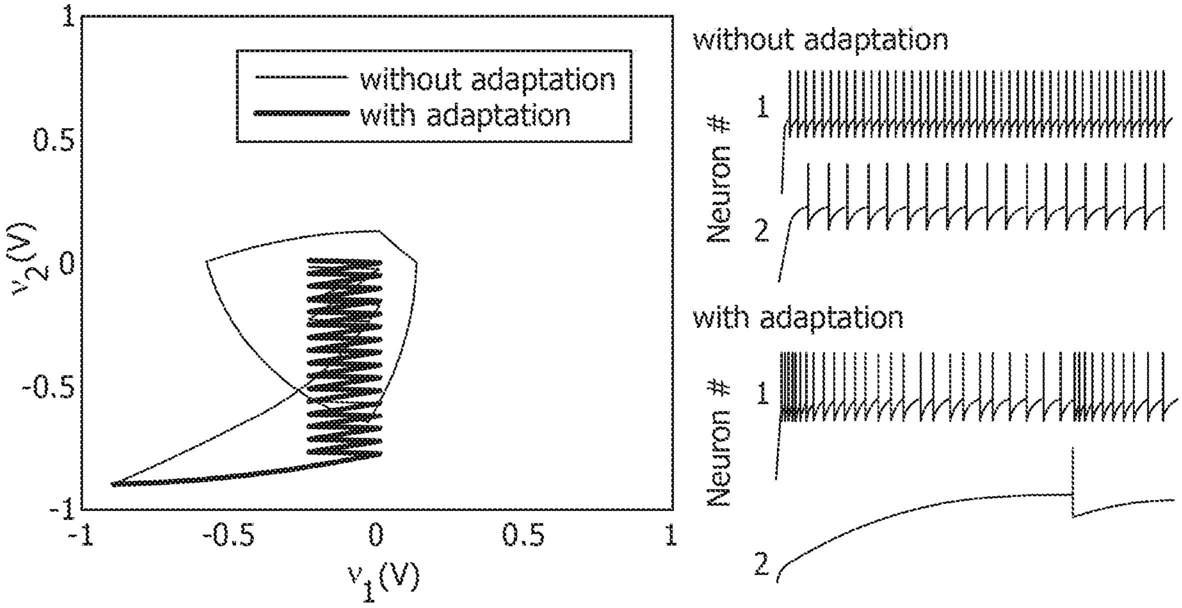
FIG. 6B is a result of a process for energy optimization under different conditions leading to different limit cycles within the same energy landscape.

The proposed framework can be extended to a network model where the neurons, apart from external stimuli, receive inputs from other neurons in the network. First, Q is considered to be a positive-definite matrix, which gives a unique solution of EQ. 2. Although elements of the coupling matrix Q already capture the interactions among neurons in a coupled network, modulation function may be further defined as follows to make the proposed model behave as a standard spiking network $$\tau_i(t) = \phi\left(h(t) * \sum_{j=1}^{M} Q_{ij}\Psi(v_j(t))\right) \qquad \text{EQ. 28}$$

with the compressive-function $\phi(.)$ given by EQ. 27. EQ. 28 ensures that $Q_{ij}>0$ corresponds to an excitatory coupling from the pre-synaptic neuron j, and $Q_{ij}<0$ corresponds to an inhibitory coupling, as shown in FIG. 6A. FIG. 6A shows results from a 2-neuron network with excitatory and inhibitory couplings. Irrespective of whether such a pre-synaptic adaptation is implemented or not, the neurons under the same energy landscape would converge to the same sub-domain, albeit with different response trajectories and steady-state limit-cycles. This is shown in FIG. 6B and illustrates which plots the energy contours for a two-neuron network corresponding to a Q matrix with excitatory and inhibitory connections and a fixed stimulus vector b. FIG. 6B shows energy optimization process under different conditions that lead to different limit cycles within the same energy landscape. FIG. 6B also shows the responses of the two neurons starting from the same initial conditions, with and without pre-synaptic adaptation. The latter corresponds to the case where the only coupling between the two neurons is through the coupling matrix Q, but there is no pre-synaptic spike-time dependent adaptation. Because the energy landscape is the same in both cases, the neurons converge to the same sub-domain, but with widely varying trajectories and steady-state response patterns.

Figure 6C:
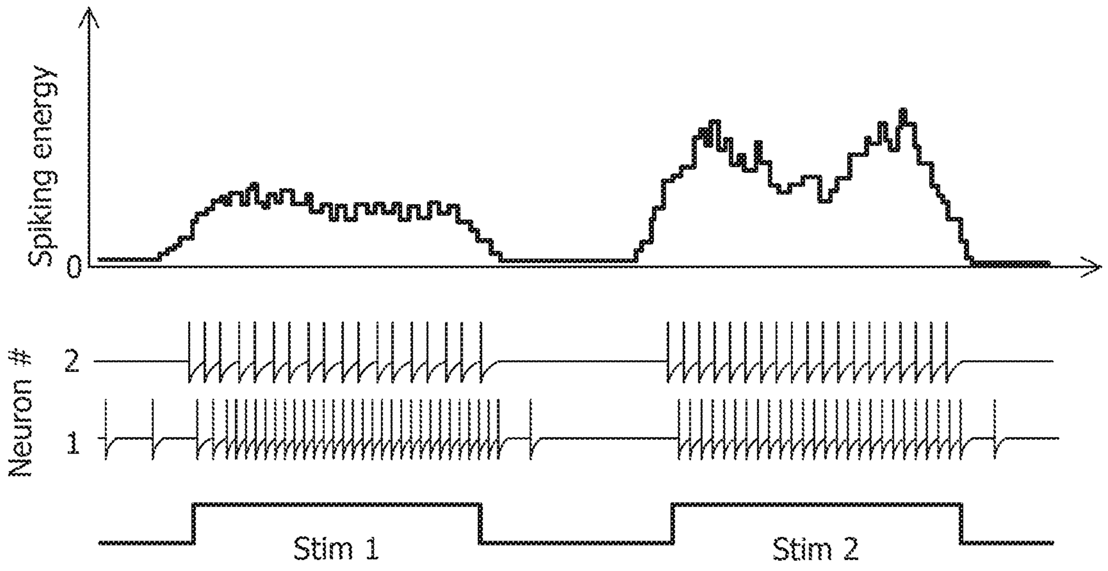
FIG. 6C is a model of mean spiking energy $\int\Psi(.)dv$ and firing patterns in response to two stimuli in the absence of global adaptation.
Figure 6D:
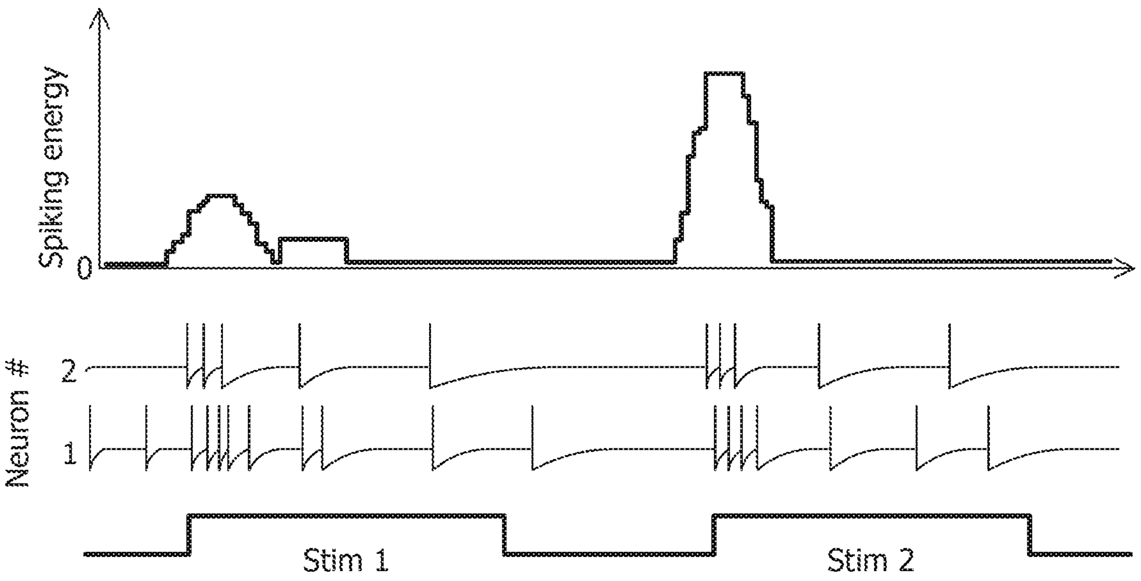
FIG. 6D is a model of mean spiking energy $\int\Psi(.)dv$ and firing patterns in response to two stimuli in the presence of global adaptation.

Apart from the pre-synaptic adaptation that changes individual firing rates based on the input spikes received by each neuron, neurons in the coupled network can be made to adapt according to the global dynamics by changing the modulation function as follows $$\tau_i(t) = \phi\left(h(t) * \left(\sum_{j=1}^{M} Q_{ij}\Psi(v_j(t)) - \mathcal{F}(\mathcal{H}, \dot{\mathcal{H}})\right)\right) \qquad \text{EQ. 29}$$

with the compressive-function $\phi(.)$ given by EQ. 27. The new function F(.) is used to capture the dynamics of the network cost-function. As the network starts to stabilize and converge to a fixed-point, the function $\tau_i(.)$ adapts to reduce the spiking rate of the neuron without affecting the steady-state solution. FIG. 6C and FIG. 6D show the time-evolution of the spiking energy $\int\Psi(.)dv$ and the spike-trains for a two-neuron network without global adaptation and with global adaptation, respectively, using the following form for the adaptation term $$\mathcal{F}(\mathcal{H}, \dot{\mathcal{H}}) = \begin{cases} \mathcal{F}_0, & \mathbb{E}_T(\dot{\mathcal{H}}) \approx 0 \\ 0, & \text{otherwise} \end{cases}. \qquad \text{EQ. 30}$$

where $F_0>0$ is a tunable parameter. This feature is important in designing energy-efficient spiking networks where energy is only dissipated during transients.

Next, a small network of neurons on a two-dimensional co-ordinate space is considered, and arbitrary inputs are assigned to the neurons. A Gaussian kernel is chosen for the coupling matrix Q as follows $$Q_{ij} = \exp(-\gamma\|x_i - x_j\|_2^2). \qquad \text{EQ. 31}$$

Figure 7A:
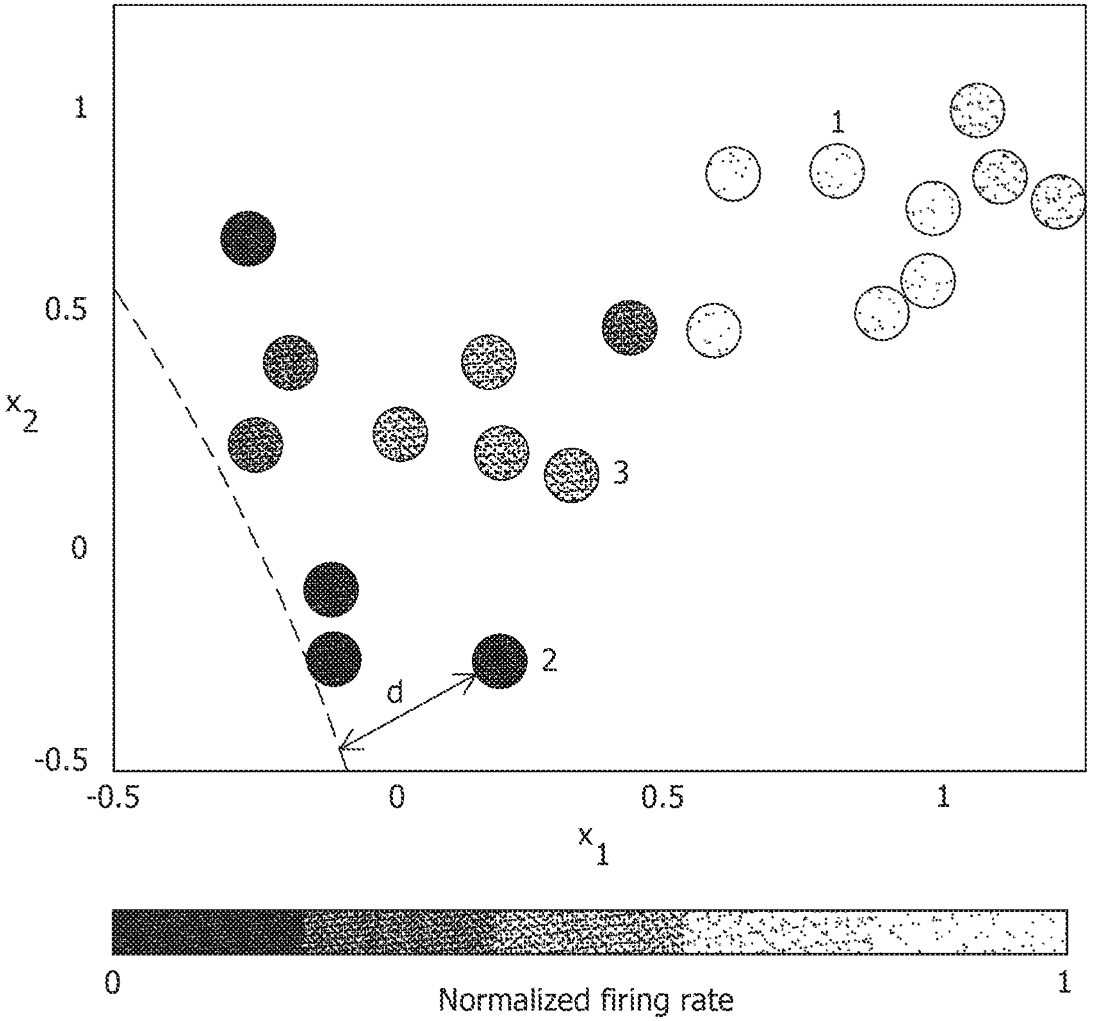
FIG. 7A is a contour plot of spiking activity corresponding to a particular stimulus vector.
Figure 7B:
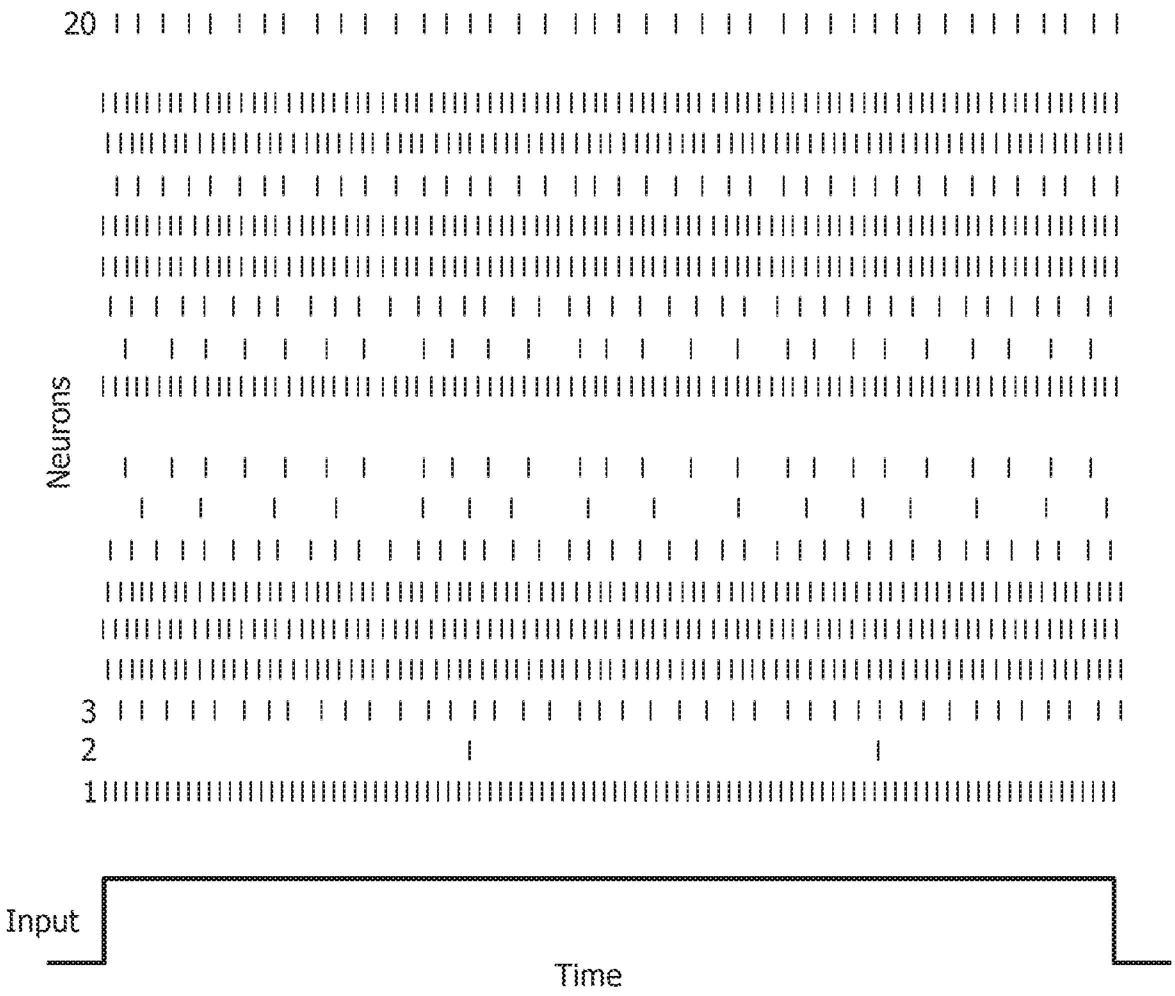
FIG. 7B is a spike raster graph for all neurons for the input in the contour plot of FIG. 7A.

This clusters neurons with stronger couplings between them closer to each other on the co-ordinate space, while placing neurons with weaker couplings far away from each other. FIG. 7A shows a contour plot of spiking activity. A network consisting of 20 neurons is shown in FIG. 7A, which also shows how the spiking activity changes as a function of the location of the neuron with respect to the hyperplane corresponding to $\Psi=0$, indicated by the white dashed line. Each neuron is color coded based on the mean firing rate and are normalized with respect to the maximum mean firing rate, with which it responds when the stimulus is on. FIG. 7B shows the spike raster for the entire network. The responsiveness of the neurons to a particular stimulus increases with the distance at which it is located from the hypothetical hyperplane in the high-dimensional space to which the neurons are mapped through kernel transformation. This geometric representation can provide insights on population-level dynamics in the network considered.

Figure 7C:
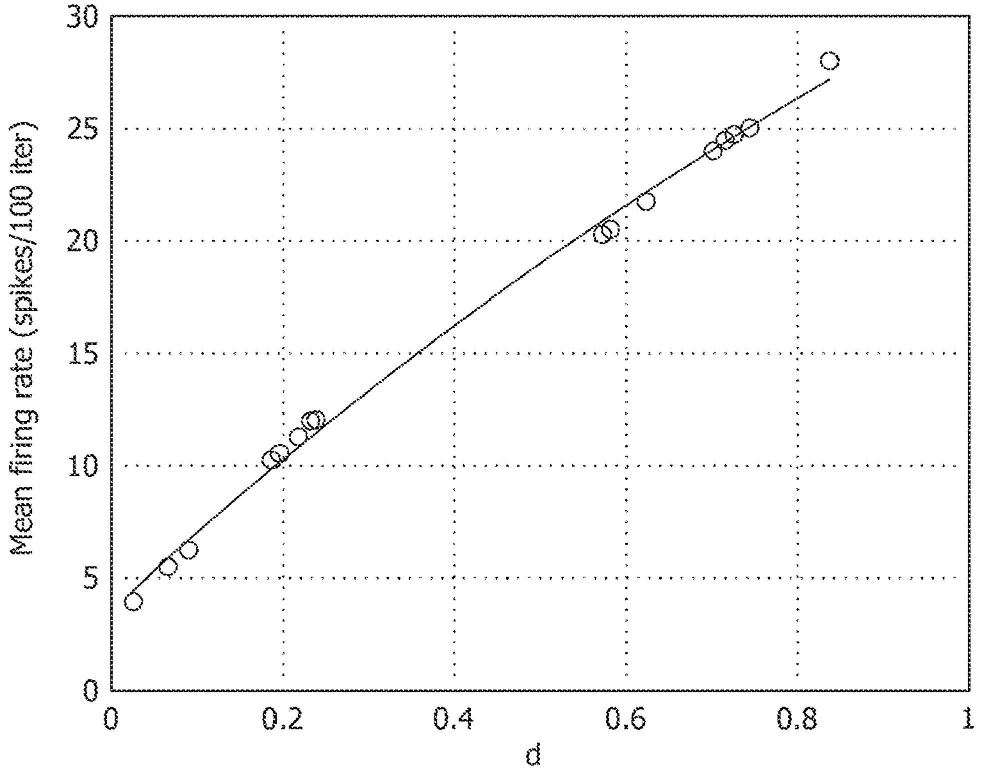
FIG. 7C is a mean firing rate of the contour plot of FIG. 7A.
Figure 7D:
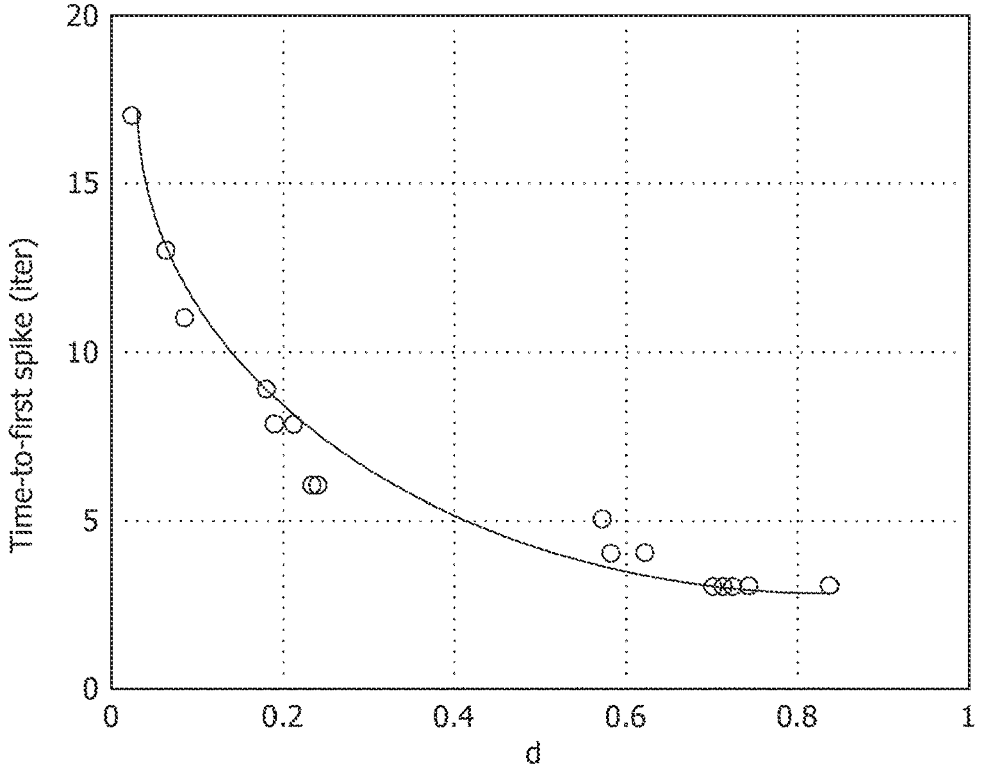
FIG. 7D is a time-to-first spike as a function of distance for each neuron in a network.

The Growth Transform neural network inherently shows a number of encoding properties that are commonly observed in biological neural networks. For example, the firing rate averaged over a time window is a popular rate coding technique that claims that the spiking frequency or rate increases with stimulus intensity. A temporal code like the time-to-first-spike posits that a stronger stimulus brings a neuron to the spiking threshold faster, generating a spike, and hence relative spike arrival times contain critical information about the stimulus. These coding schemes can be interpreted under the umbrella of network coding using the same geometric representation considered above. Here, the responsiveness of a neuron is closely related to its proximity to the hyperplane. The neurons which exhibit more spiking are located at a greater distance from the hyperplane. FIG. 7C shows the mean firing rate and FIG. 7D shows time-to-first spike as a function of the distance d for each neuron in the network. FIG. 7*c* and FIG. 7D show that as this value increases, the average firing rate of a neuron (number of spikes in a fixed number of time-steps or iterations) increases, and the time-to-first spike becomes progressively smaller. Neurons with a distance value below a certain threshold do not spike at all during the stimulus period, and therefore have a mean firing rate of zero and time-to-spike at infinity. Therefore, based on how the network is configured in terms of synaptic inputs and connection strengths, the spiking pattern of individual neurons conveys critical information about the network hyperplane and their placement with respect to it.

The encoding of a stimulus in the spatiotemporal evolution of activity in a large population of neurons is often represented by a unique trajectory in a high-dimensional space, where each dimension accounts for the time-binned spiking activity of a single neuron. Projection of the high-dimensional activity to two or three critical dimensions using dimensionality reduction techniques like Principal Component Analysis (PCA) and Linear Discriminant Analysis (LDA) have been widely used across organisms and brain regions to shed light on how neural population response evolves when a stimulus is delivered. For example in identity coding, trajectories corresponding to different stimuli evolve toward different regions in the reduced neural subspace, that often become more discriminable with time and are stable over repeated presentations of a particular stimulus. This can be explained in the context of the geometric interpretation.

Figure 8A:
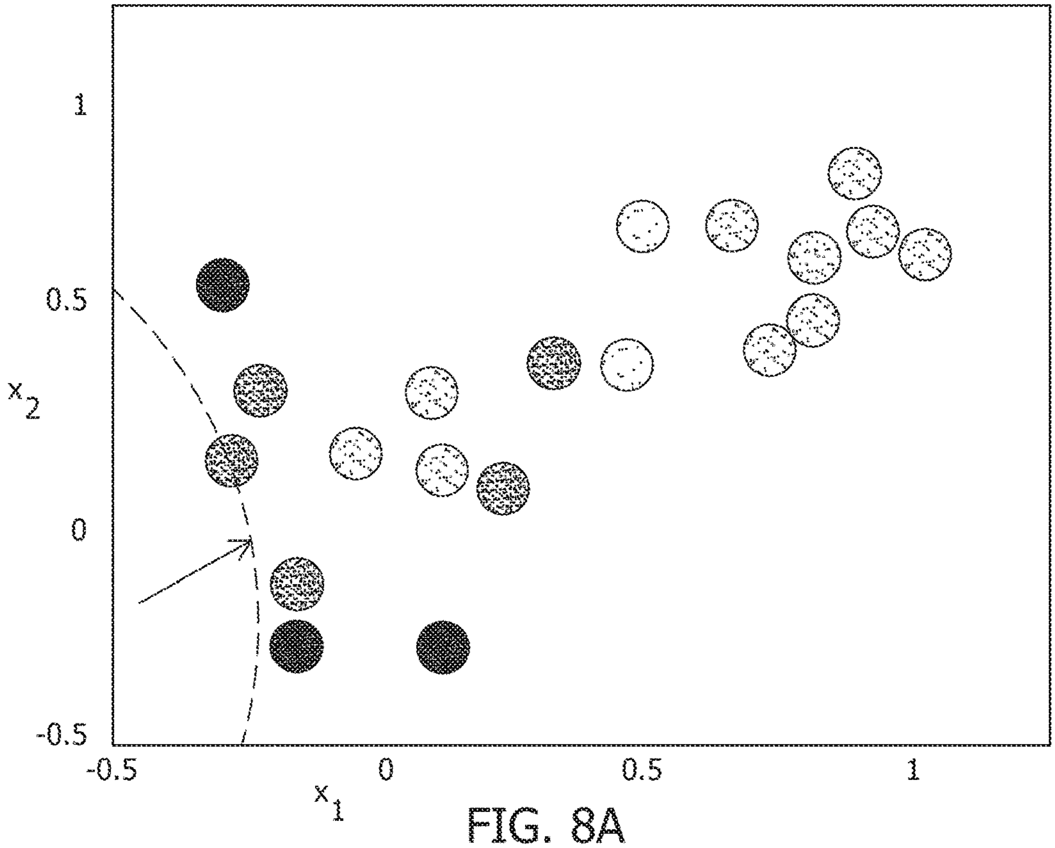
FIG. 8A is a contour of a perturbation, of a stimulus vector, in a first direction for a network.
Figure 8B:
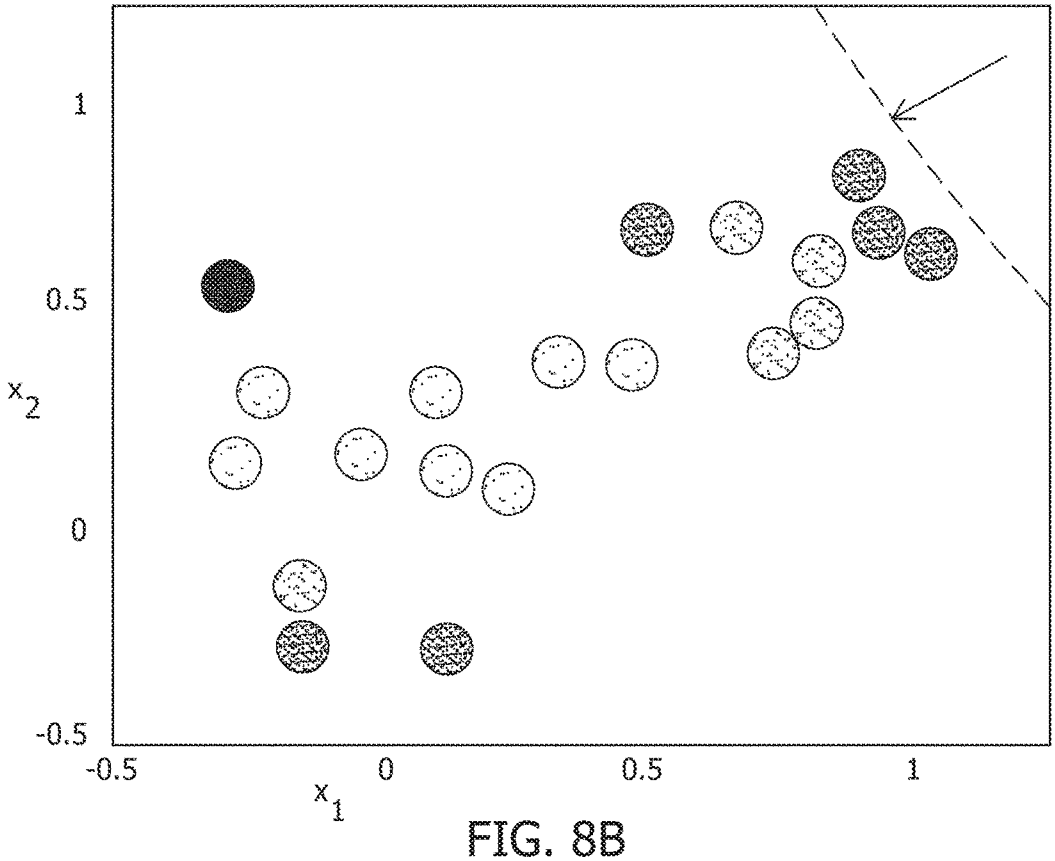
FIG. 8B is a contour of a perturbation, of a stimulus vector, in a second direction for a network.
Figure 8C:
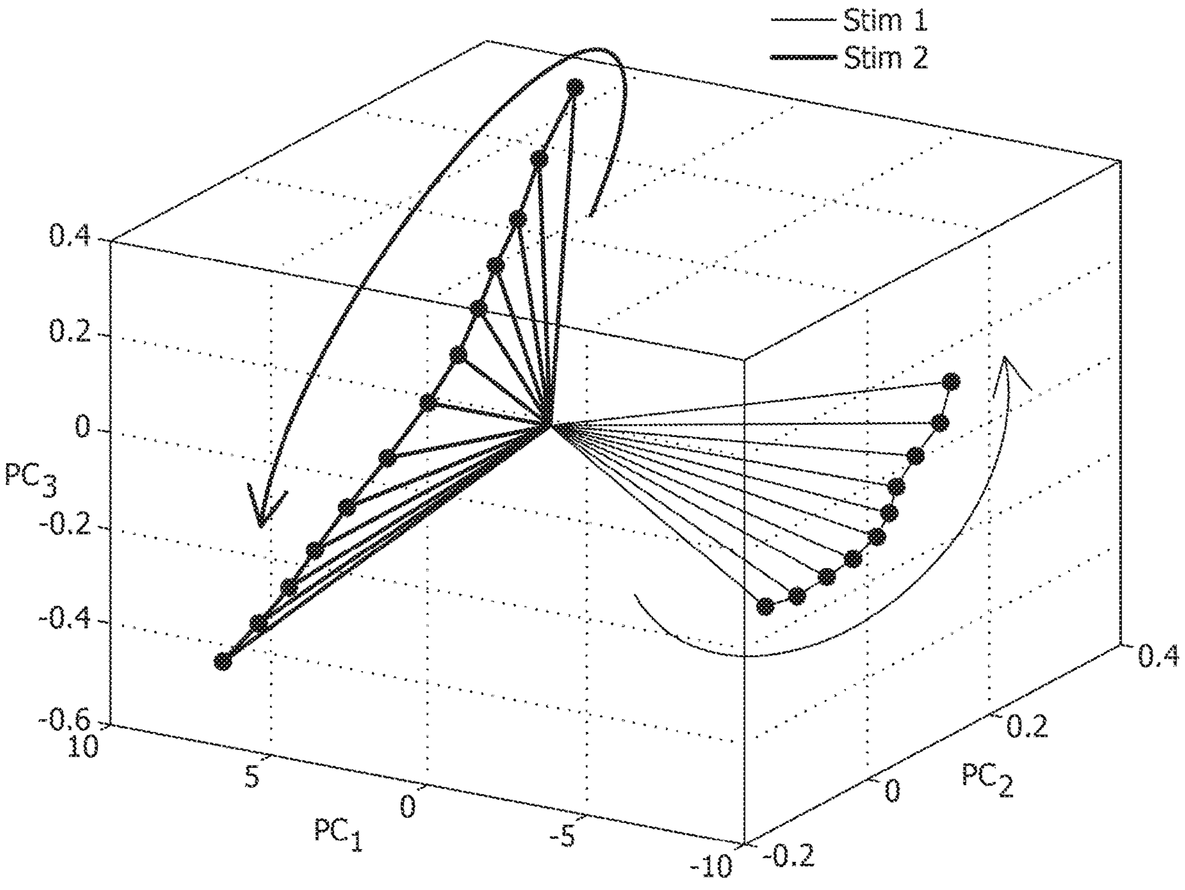
FIG. 8C is a model of neural activity unfolding in distinct stimulus-specific areas of neural subspace.

For the same network as above, the experiment starts from the same baseline, and perturbing the stimulus vector in two different directions. This pushes the network hyperplane in two different directions, exciting different subsets of neurons, as illustrated in FIGS. 8A and 8B. FIGS. 7A and 7B show perturbation of the stimulus vector in different directions for the same network that produces two different contours. A similar dimensionality reduction to three principal components shows the neural activity unfolding in distinct stimulus-specific areas of the neural subspace, as illustrated in FIG. 8C. FIG. 8C shows corresponding population activities trace different trajectories in the neural subspace. The two contour plots also show that some neurons may spike for both the inputs, while some spike selectively for one of them. Yet others may not show any spiking for either stimulus, but may spike for some other stimulus vector and the corresponding stimulus-specific hyperplane.

Figure 9A:
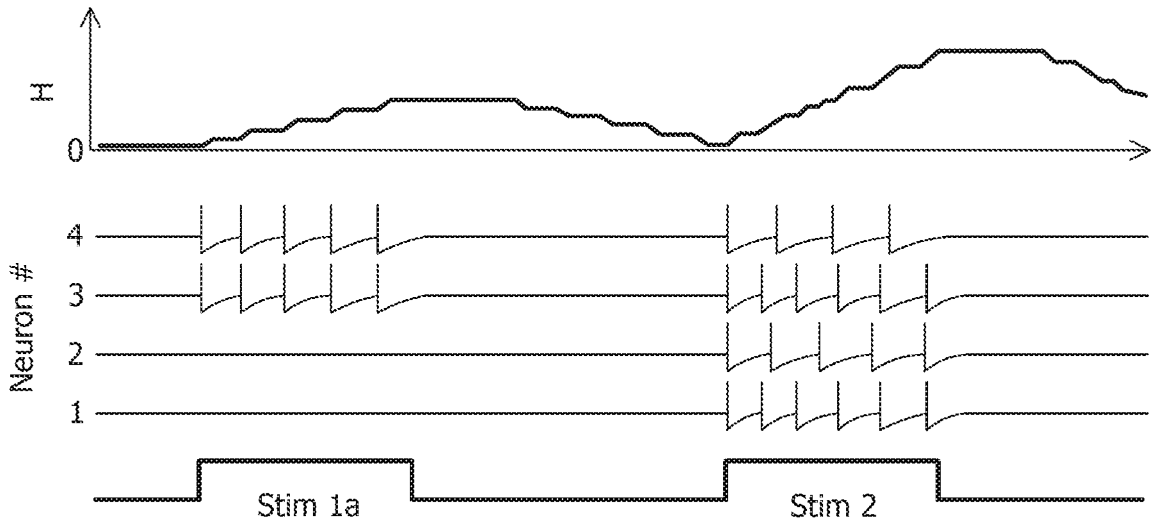
FIG. 9A is a stimulus response for a 4-neuron network with a first stimulus history for an uncoupled network.
Figure 9B:
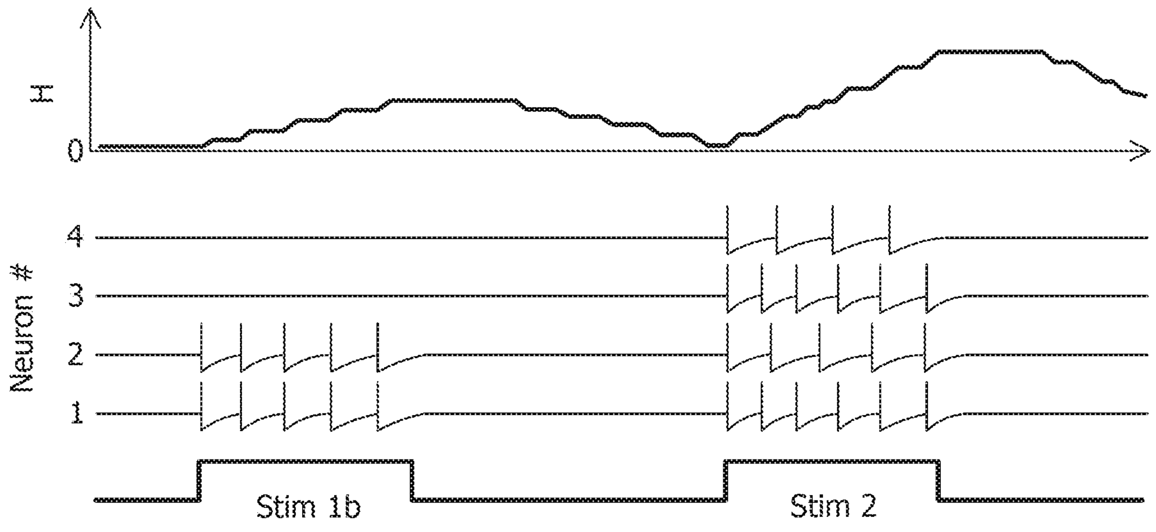
FIG. 9B is a stimulus response for a 4-neuron network with a second stimulus history for an uncoupled network.
Figure 9C:
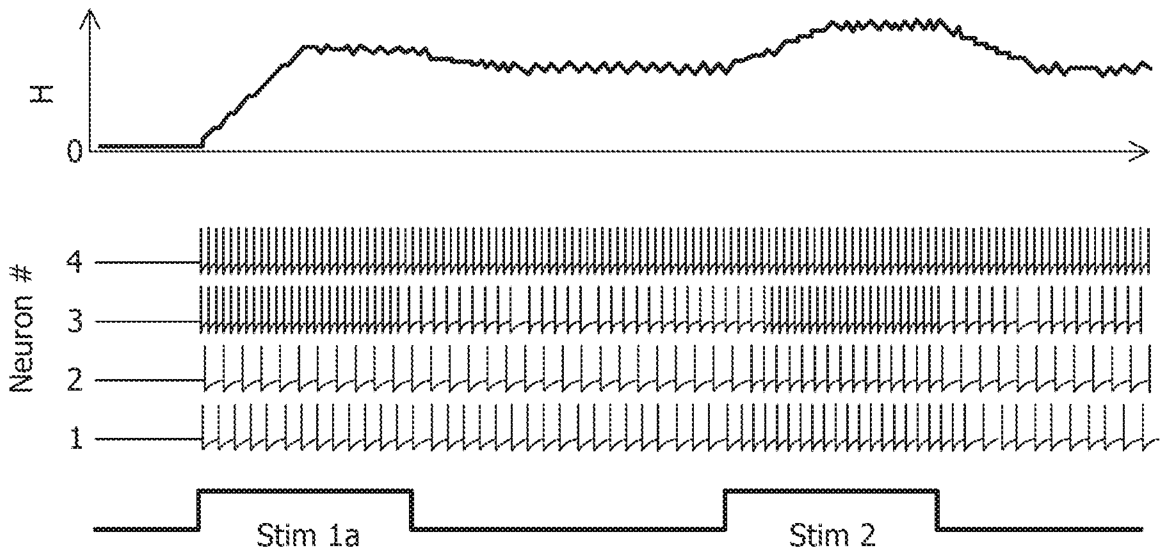
FIG. 9C is a stimulus response for a 4-neuron network with a first stimulus history for a coupled network with a positive definite coupling matrix Q.
Figure 9D:
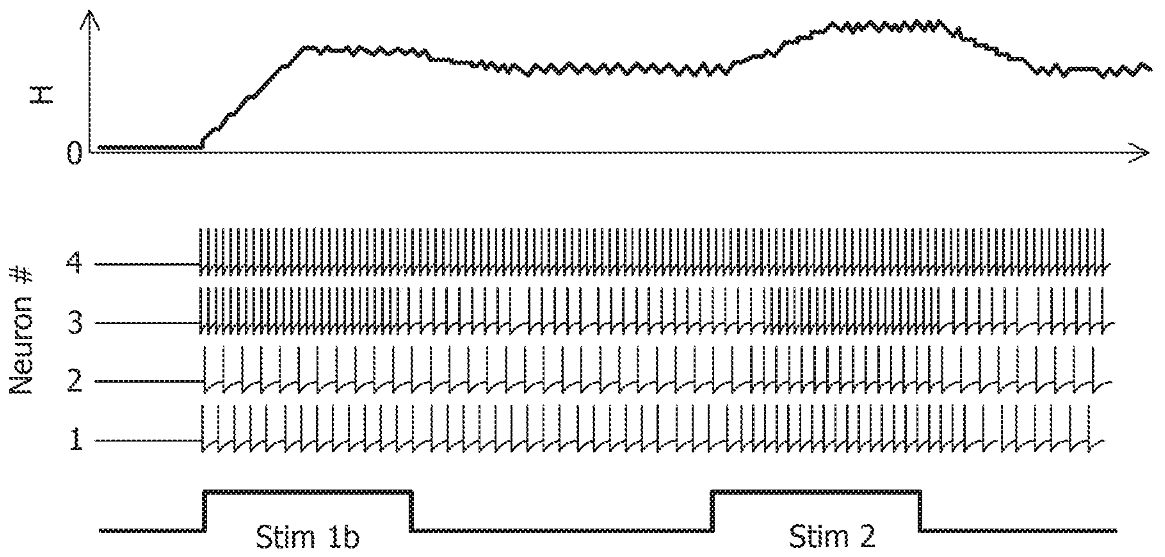
FIG. 9D is a stimulus response for a 4-neuron network with a second stimulus history for a coupled network with a positive definite coupling matrix Q.
Figure 9E:
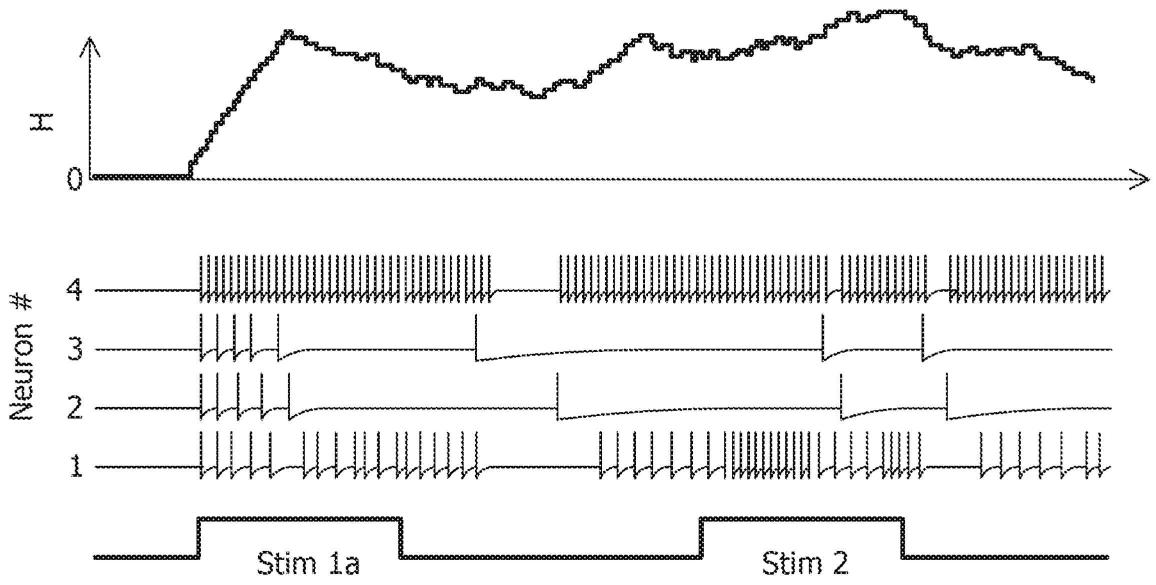
FIG. 9E is a stimulus response for a 4-neuron network with a first stimulus history for a coupled network with a non-positive definite coupling matrix Q.
Figure 9F:
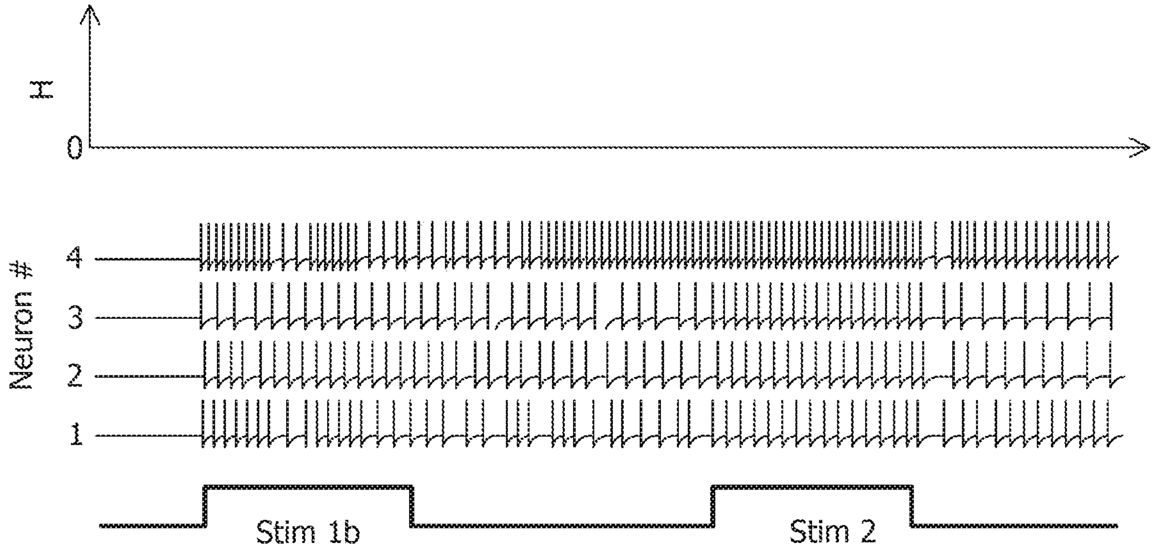
FIG. 9F is a stimulus response for a 4-neuron network with a second stimulus history for a coupled network with a non-positive definite coupling matrix Q.

FIGS. 9A-9F describe a coupled spiking network can function as a memory element, when Q is a non-positive definite matrix and $$\tau_i(t) = \phi\left(h(t) * \sum_{j=1}^{M} Q_{ij}\Psi(v_j(t))\right), \quad \text{EQ. 32}$$

due to the presence of more than one attractor state. This is demonstrated by considering two different stimulus histories in a network of four neurons, where a stimulus "Stim 1a" precedes another stimulus "Stim 2" in FIG. 9A, FIG. 9C, and FIG. 9E. A different stimulus 'Stim 1b' precedes "Stim 2" in FIG. 9B, FIG. 9D, and FIG. 9F Here, each "stimulus" corresponds to a different input vector b. For an uncoupled network, where neurons do not receive any inputs from other neurons, the network energy increases when the first stimulus is applied and returns to zero afterwards, and the network begins from the same state again for the second stimulus as for the first, leading to the same firing pattern for the second stimulus, as shown in FIG. 9A and FIG. 9B, independent of the history. For a coupled network with a positive definite coupling matrix Q, reinforcing loops of spiking activity in the network may not allow the network energy to go to zero after the first stimulus is removed, and the residual energy may cause the network to exhibit a baseline activity that depends on stimulus history, as long as there is no dissipation. When the second stimulus is applied, the initial conditions for the network are different for the two stimulus histories, leading to two different transients until the network settles down into the same steady-state firing patterns, as shown in FIG. 9C and FIG. 9D. For a non-positive definite coupling matrix Q however, depending on the initial condition, the network may settle down to different solutions for the same second stimulus, due to the possible presence of more than one local minimum. This leads to completely different transients as well as steady-state responses for the second stimulus, as shown in FIG. 9E and FIG. 9F. This history-dependent stimulus response could serve as a short-term memory, where residual network energy from a previous external input subserves synaptic interactions among a population of neurons to set specific initial conditions for a future stimulus based on the stimulus history, forcing the network to settle down in a particular attractor state.

Associative memories are neural networks which can store memory patterns in the activity of neurons in a network through a Hebbian modification of their synaptic weights and recall a stored pattern when stimulated with a partial fragment or a noisy version of the pattern. Using an associative memory network of Growth Transform neurons shows how network trajectories are used to recall stored patterns and to use global adaptation using very few spikes and high recall accuracy.

The network comprises M=100 neurons, out of which a randomly selected subset m=10 are active for any stored memory pattern. The elements of the transconductance coupling matrix are set according to the following standard Hebbian learning rule $$Q_{ij} = \frac{1}{k}\sum_{s=1}^{S} t_i^s t_j^s, \quad \text{EQ. 33}$$

where k is a scaling factor and $t^s \in [0, 1]^M$, s=1, . . . , S, are the binary patterns stored in the network. During the recall phase, only half of the cells active in the original memory are stimulated with a steady depolarizing input, and the spiking pattern across the network is recorded. Instead of determining the active neurons during recall through thresholding and directly comparing with the stored binary pattern, the recall performance of the network was quantitatively measured by computing the mean distance between each pair of original-recall spiking dynamics as they unfold over time. This ensures that the firing of the neurons that belong to the pattern is accounted for, albeit are not directly stimulated, but exploits any contributions from the rest of the neurons in making the spiking dynamics more dissimilar in comparison to recalls for other patterns.

Figure 10A:
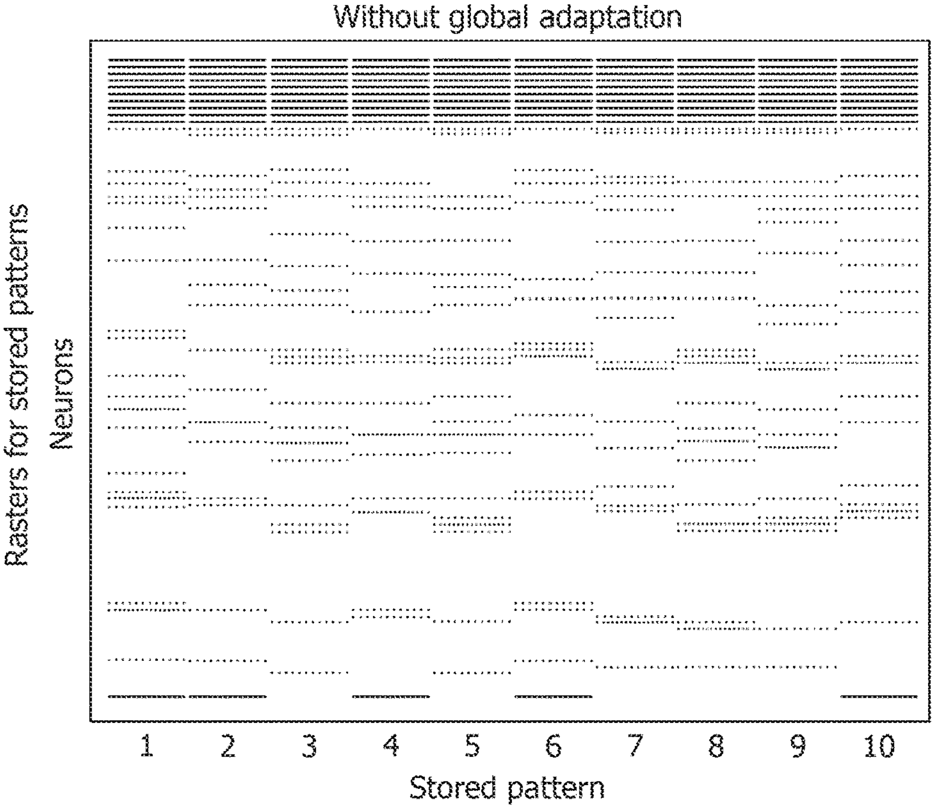
FIG. 10A is a spike raster graph for the 10 stored patterns in the absence of global adaptation.
Figure 10B:
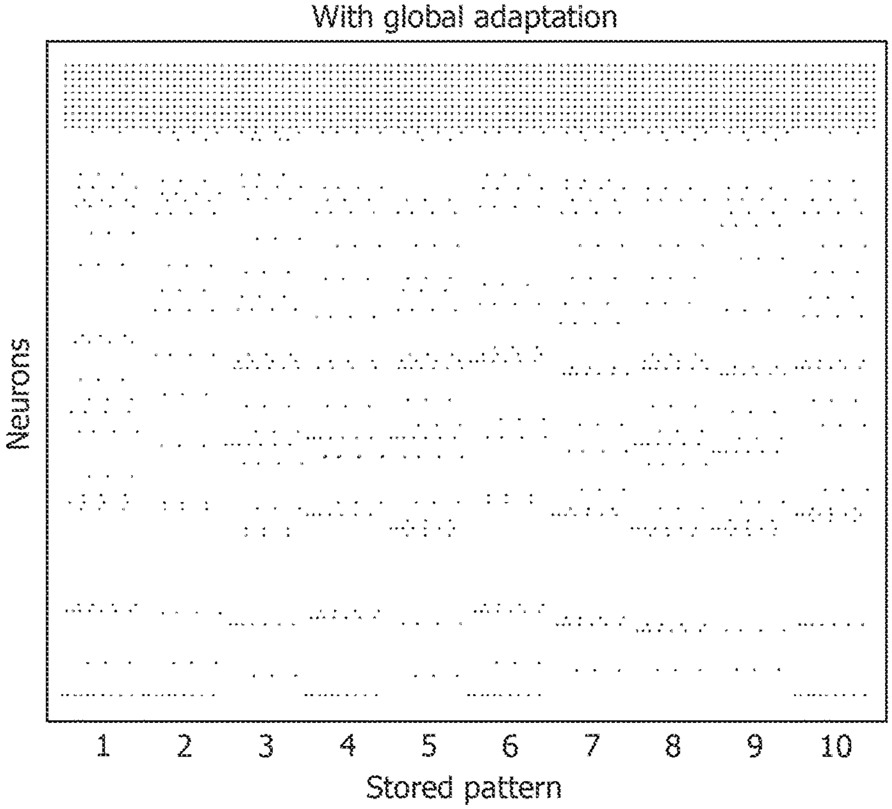
FIG. 10B is a spike raster graph for the 10 stored patterns in the presence of global adaptation.
Figure 10C:
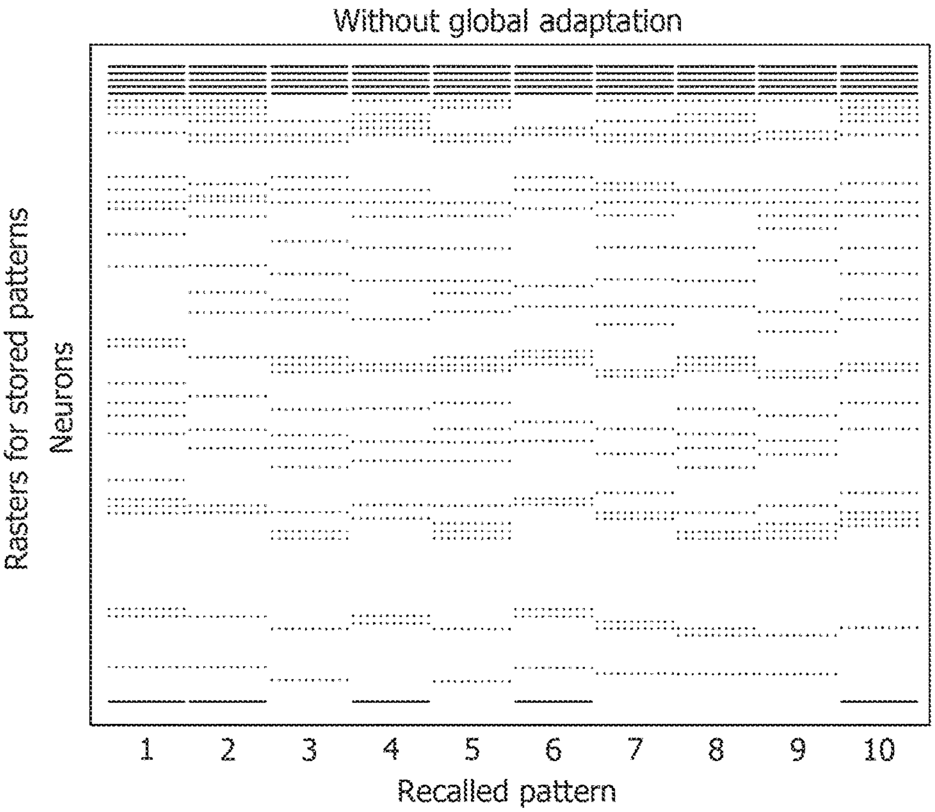
FIG. 10C is a spike raster graph for 10 recall cases in the absence of global adaptation.
Figure 10D:
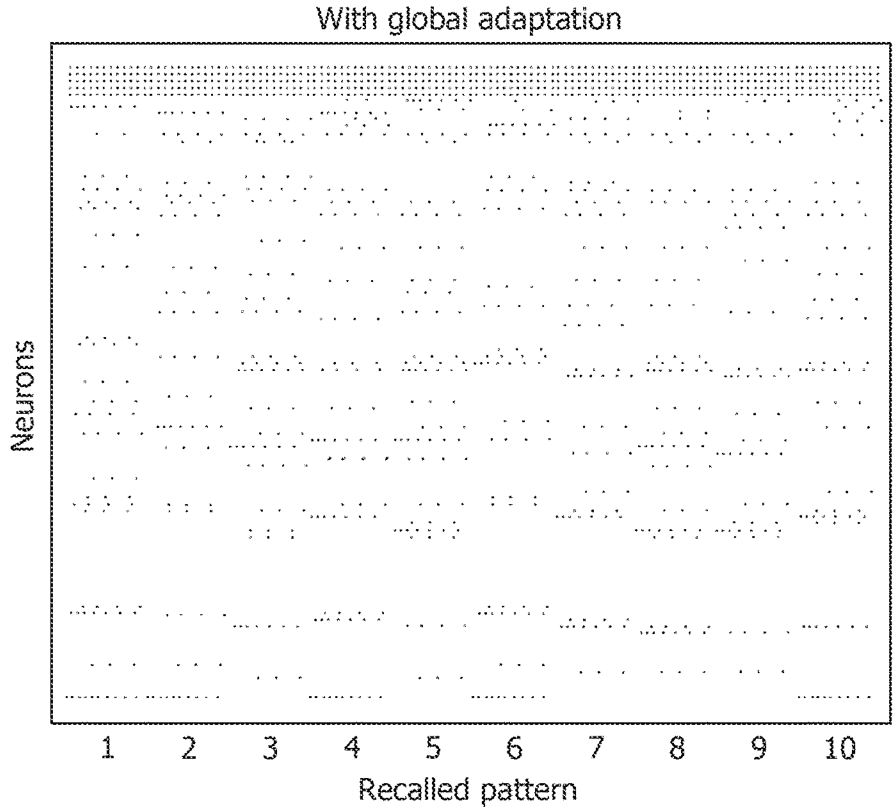
FIG. 10D is a spike raster graph for 10 recall cases in the presence of global adaptation.
Figure 11A:
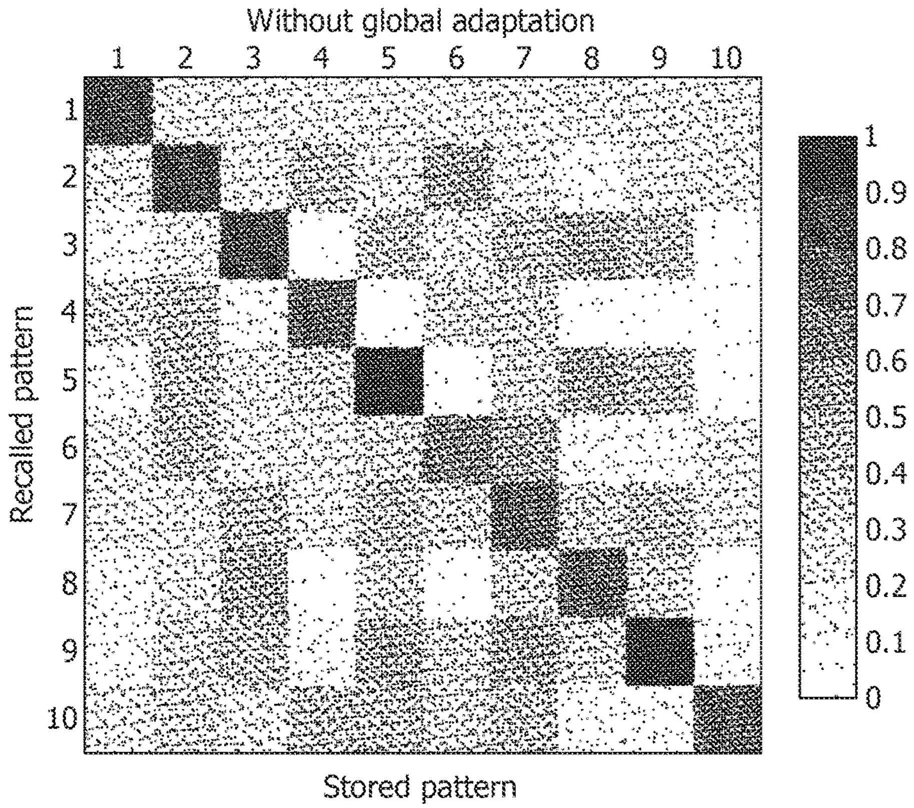
FIG. 11A is a similarity matrix between storage and recall with a rate-based decoding metric without global adaptation.
Figure 11B:
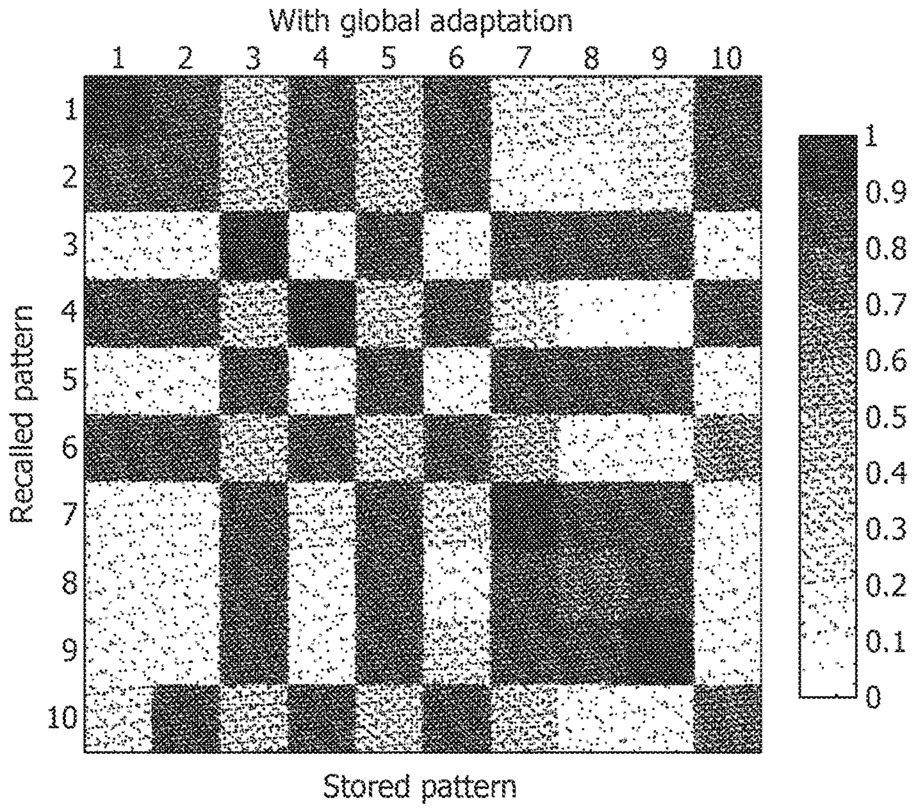
FIG. 11B is a similarity matrix between storage and recall with a rate-based decoding metric with global adaptation.
Figure 11C:
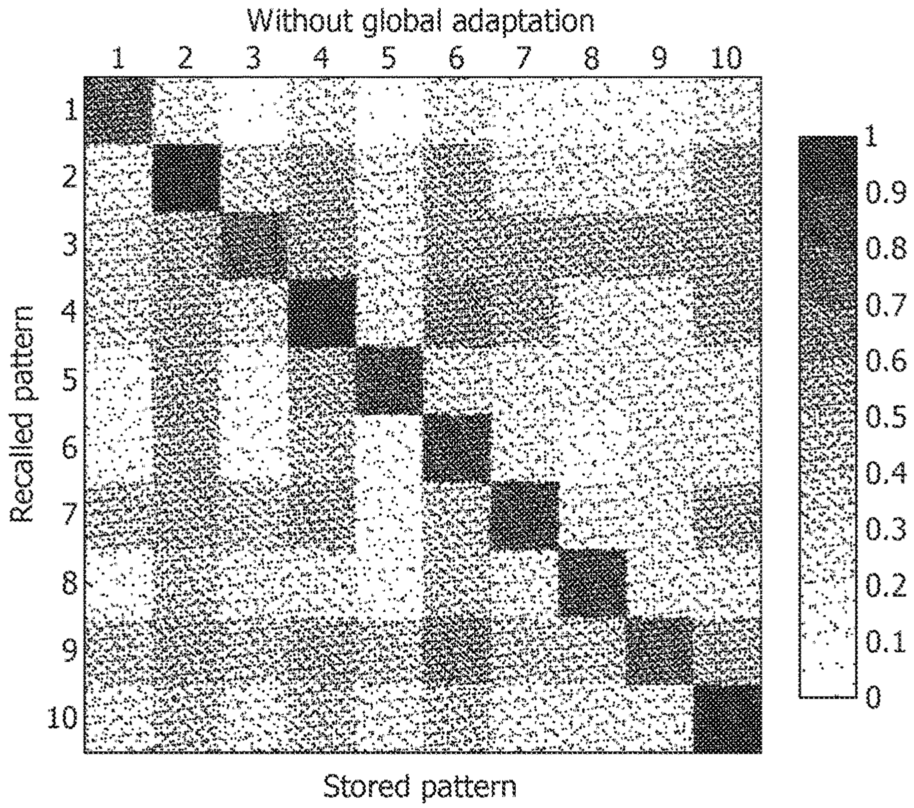
FIG. 11C is a similarity matrix with a rate-based decoding metric and spike-times and changes in mean firing rates without global adaptation.
Figure 11D:
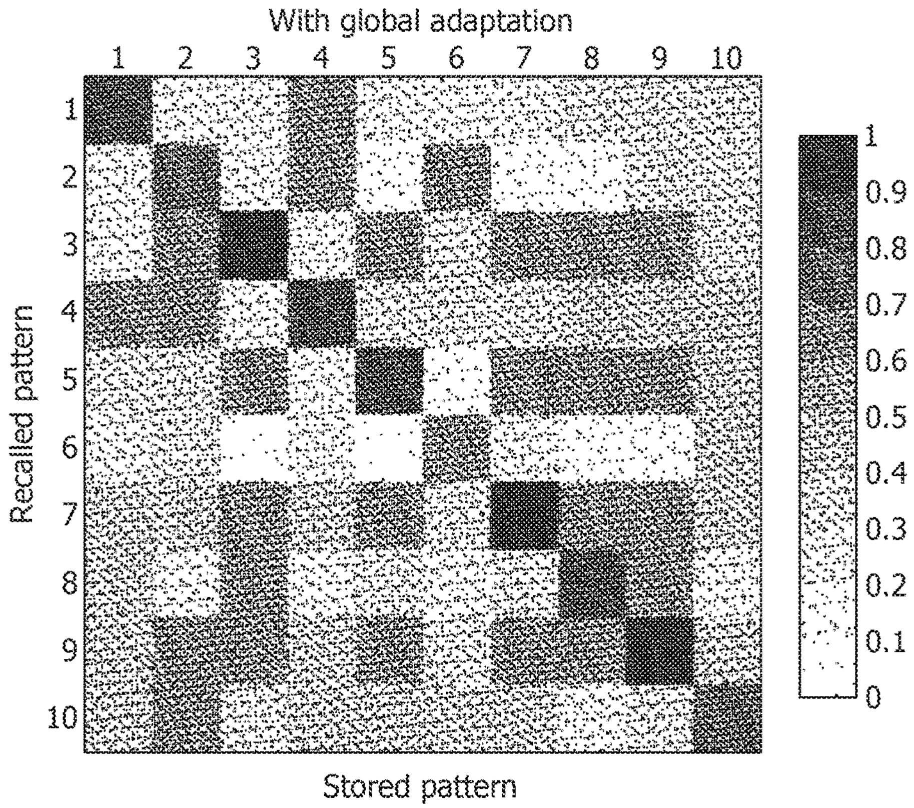
FIG. 11D is a similarity matrix with a rate-based decoding metric and spike-times and changes in mean firing rates with global adaptation.
Figure 12A:
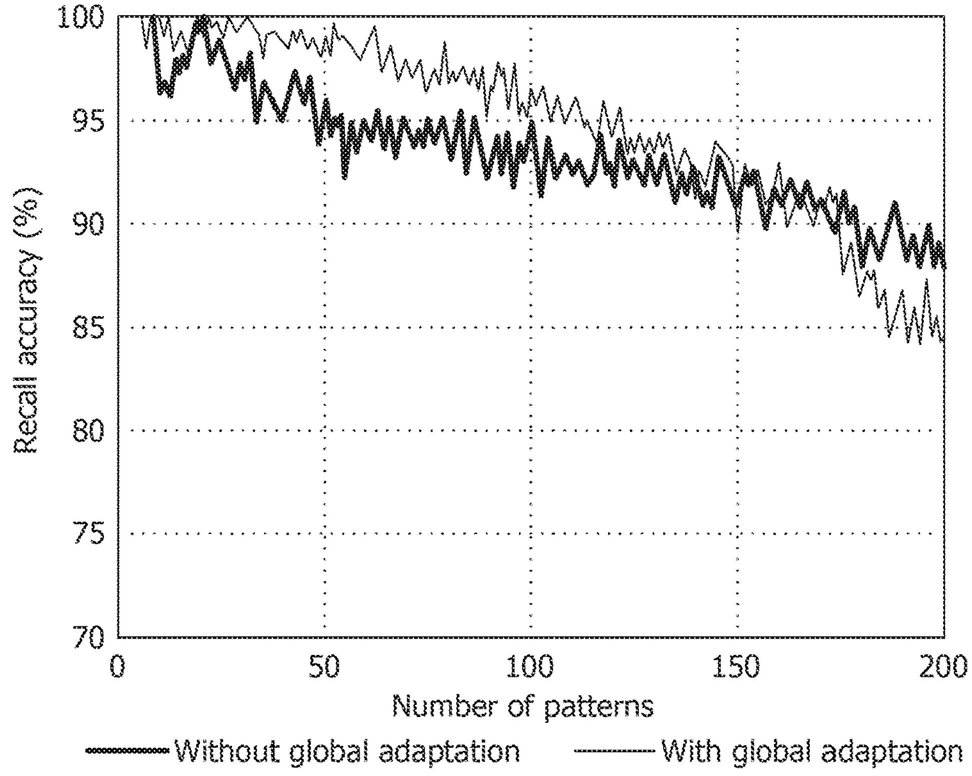
FIG. 12A is an ensemble plot showing mean recall accuracy as memory load increases for a network, in the absence and presence of global adaptation.
Figure 12B:
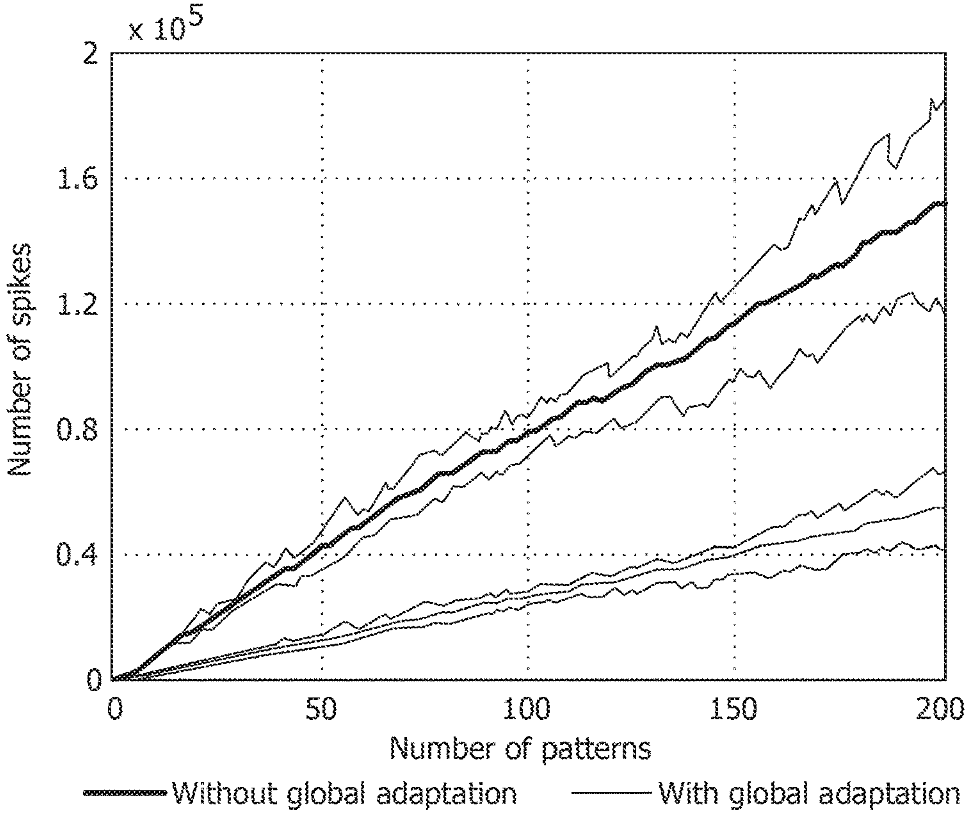
FIG. 12B is an ensemble plot showing mean number of spikes as memory load increases for a network, in the absence and presence of global adaptation.

When the network is made to globally adapt according to the system dynamics, the steady-state trajectories can be encoded using very few spikes. FIG. 10A and FIG. 10B show the raster plots for the stored patterns without and with global adaptation, respectively, when S=10. FIG. 10C and FIG. 10D are the corresponding plots during recall. For each recall pattern, spike patterns for the directly stimulated neurons are plotted first, followed by the other 5 neurons that are not directly stimulated but belong to the pattern; and finally the rest of the neurons in random order. The ordering of neurons is kept the same for plotting spike rasters for the stored patterns. During decoding, a straightforward metric using the average distance between time-binned mean firing rates for the original and recall trajectories produces similarity matrices presented in FIG. 11A and FIG. 11B, where global adaptation does not perform as well. However, the information in this case also lies in the spike-times and changes in firing rate over time for each neuron. Including these features in the decoding vectors for stored and recalled patterns allow for clean recalls in both cases as shown in FIG. 11C and FIG. 11D. The decoding vector for the n-th time-bin in this case is given by $$d_n = \begin{bmatrix} r_n \\ \Delta t_{\Psi_n} \\ \Delta r_n \end{bmatrix}, \quad \text{EQ. 34}$$

where $r_n$, $\Delta_{t\Psi}n$ and $\Delta r_n$ are the vectors of mean firing rates, mean inter-spike intervals and changes in the mean firing rates for the n-th bin for the entire network, respectively. The mean inter-spike interval is set equal to the bin length if there is a single spike over the entire bin length, and equal to twice the bin length if there are none. Note that the inter-spike interval computed for one time-bin may be different from (1/r), particularly for low firing rates, and hence encodes useful information. The similarity metric between the u-th stored pattern and the v-th recall pattern is given by $$s_{u,v} = 1 - dist_{u,v}, \quad \text{EQ. 35}$$

where $dist_{u,v}$ is the mean Euclidean distance between the two decoding vectors over the total number of time-bins, normalized between [0, 1]. To estimate the capacity of the network, the mean recall accuracy over 10 trials for varying number of stored patterns is calculated, both with and without global adaptation. FIG. 12A shows the plots of the mean recall accuracy for different number of patterns stored for the two cases, and FIG. 12B shows plots of the mean number of spikes for each storage. For each plot, the shaded region indicates the range of values across trials. As expected, the accuracy is 100% for lesser storage, but degrades with higher loading. However with global adaptation, the degradation is seen to be more graceful for a large range of storage with the decoding used in FIG. 11C and FIG. 11D, allowing the network to recall patterns more accurately using much fewer spikes. Hence by exploiting suitable decoding techniques, highly energy-efficient spiking associative memory networks with high storage capacity can be implemented. The recall accuracy using global adaptation deteriorates faster for >175 patterns. The proposed decoding algorithm, which determines the recall accuracy, takes into account the mean spiking rates, inter-spike intervals and changes in spike rates. Augmenting the decoding features with higher-order differences in inter-spike intervals or spike rates may lead to an improved performance for higher storage.

Figure 13A:
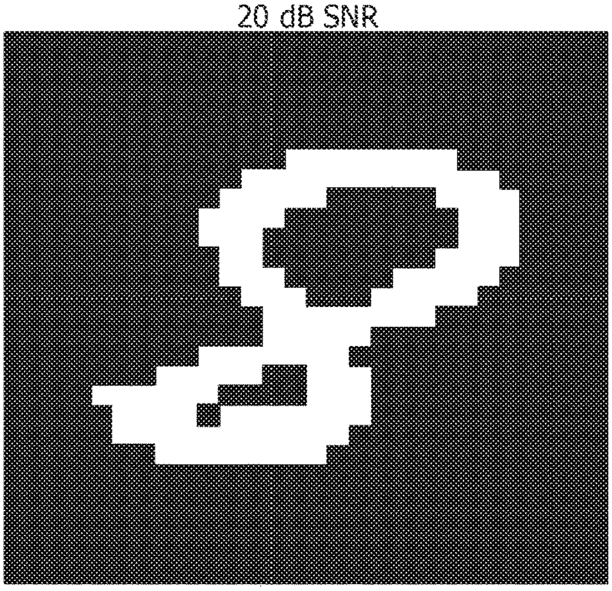
FIG. 13A is a test image corrupted with additive Gaussian noise at 20 dB SNR.
Figure 13B:
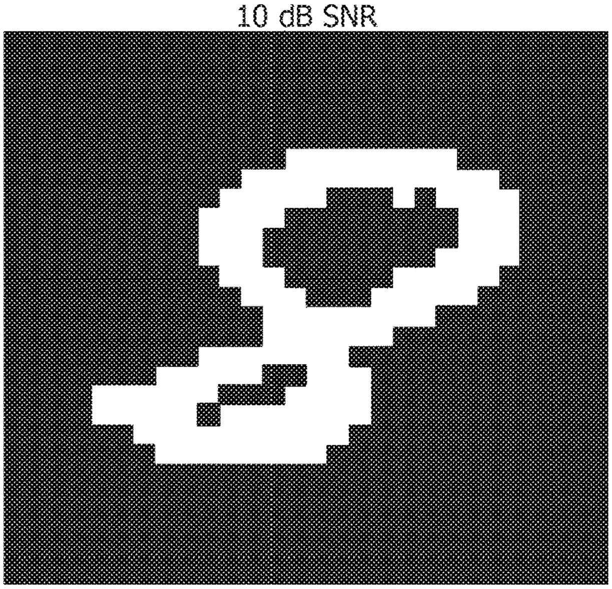
FIG. 13B is a test image corrupted with additive Gaussian noise at 10 dB SNR.
Figure 13C:
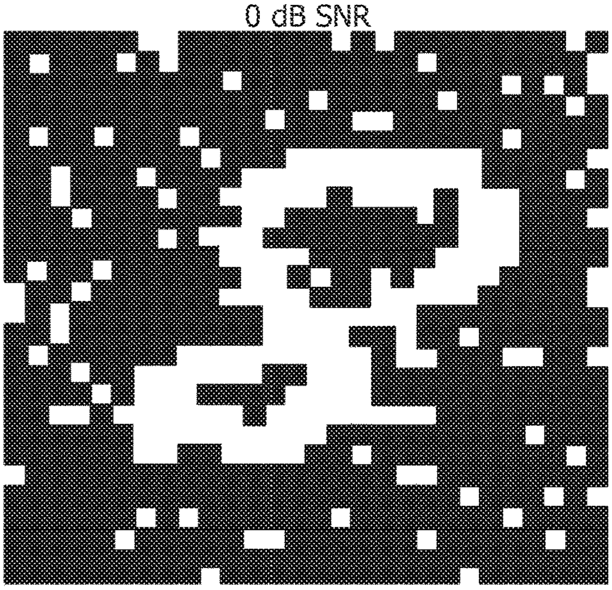
FIG. 13C is a test image corrupted with additive Gaussian noise at 0 dB SNR.

Aside from pattern completion, associative networks are also commonly used for identifying patterns from their noisy counterparts. A similar associative memory network was used as above to classify images from the MNIST dataset which were corrupted with additive white Gaussian noise at different signal-to-noise ratios (SNRs), and which were, unlike in the previous case, unseen by the network before the recall phase. The network size in this case was M=784, the number of pixels in each image, and the connectivity matrix was set using a separate, randomly selected subset of 5,000 binary, thresholded images from the training dataset according to EQ. 33. Unseen images from the test dataset were corrupted at different SNRs and fed to the network after binary thresholding. FIGS. 13A-13C show instances of the same test image at different SNRs after binary thresholding. As before, the non-zero pixels got a steady depolarizing input. A noisy test image was assigned to the class corresponding to the closest training image according to the similarity metric in EQ. 35.

Figure 13D:
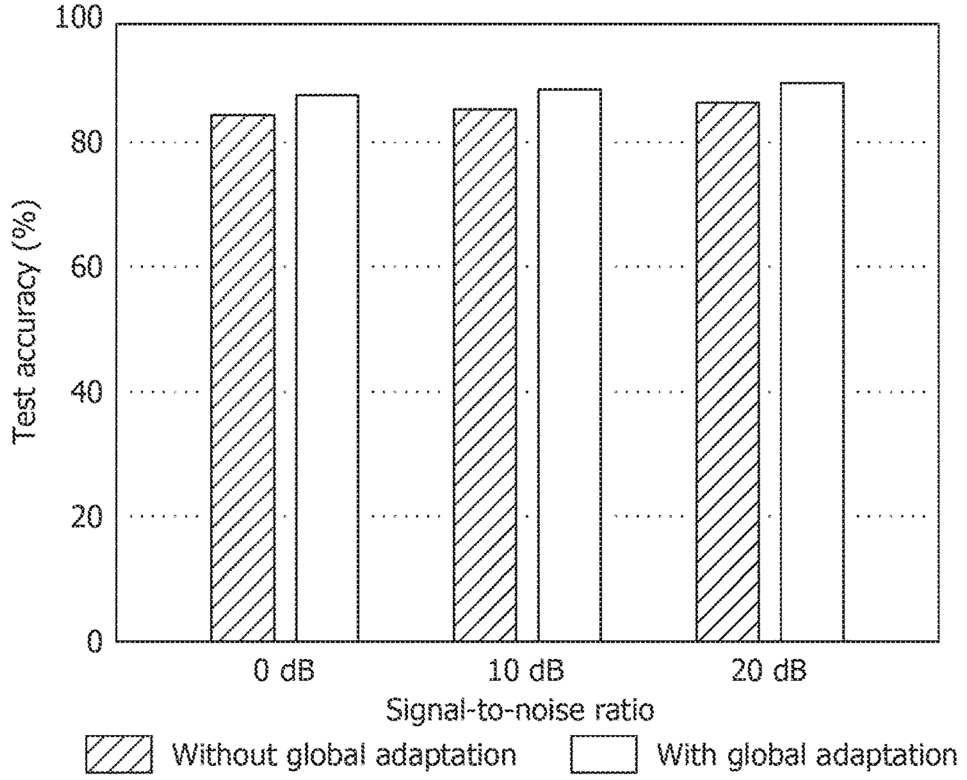
FIG. 13D is a test accuracy graph for different noise levels.
Figure 13E:
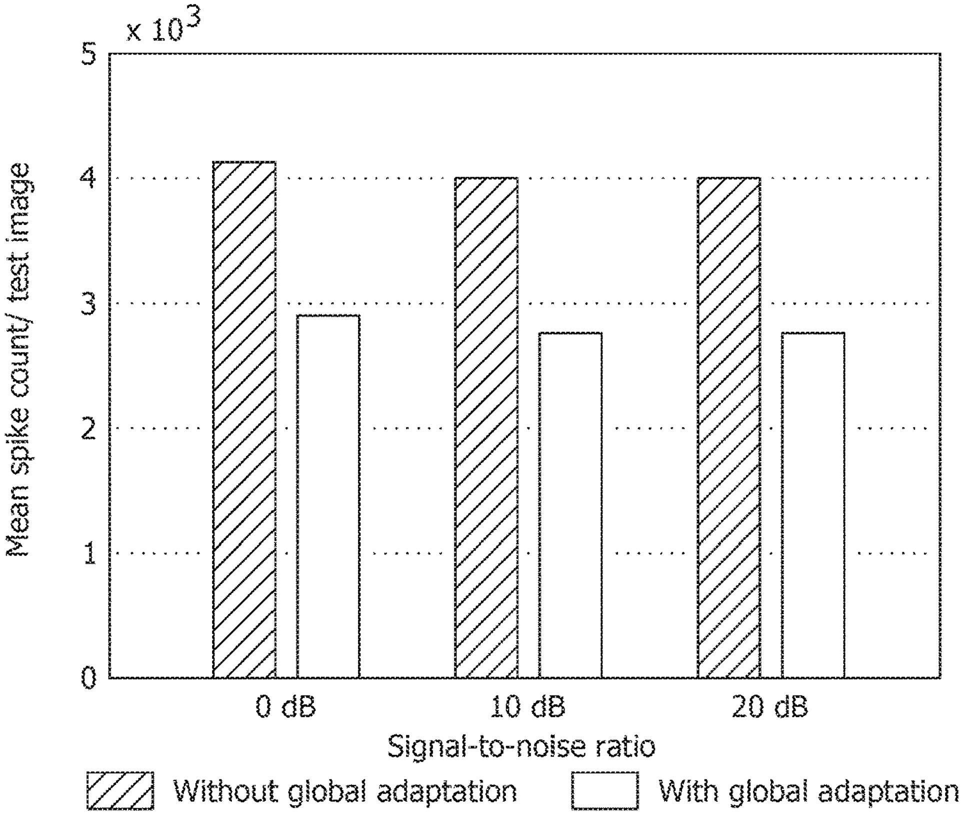
FIG. 13E is a mean spike count/test image graph for different noise levels.

The test accuracies and mean spike counts for a test image are plotted and shown in FIG. 13D and FIG. 13E, respectively, for different noise levels. Even for relatively high noise levels, the network has a robust classification performance. As before, a global adaptation based on the state of convergence of the network produces a slightly better performance with fewer spikes per test image.

Figure 14A:
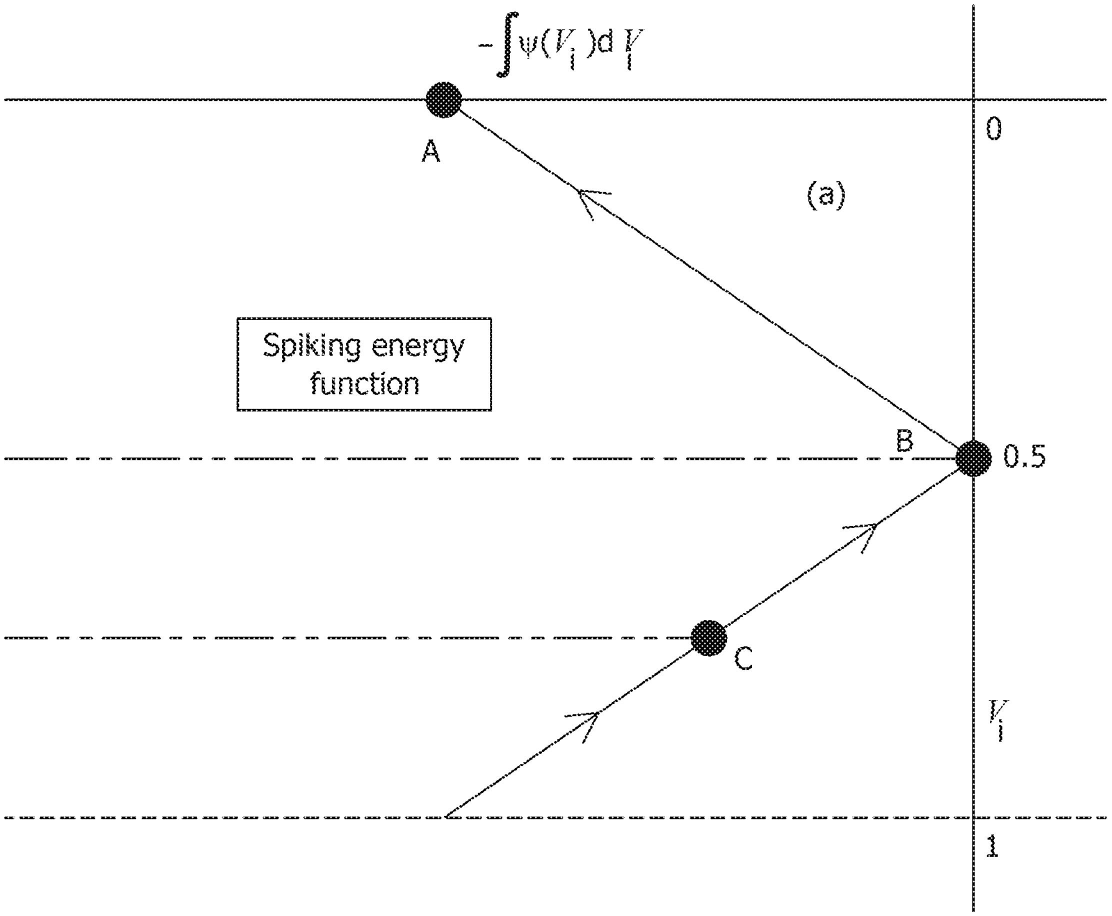
FIG. 14A is a primal-dual optimization framework for connecting neural-dynamics to network-level dynamics and showing a spiking-energy function.
Figure 14B:
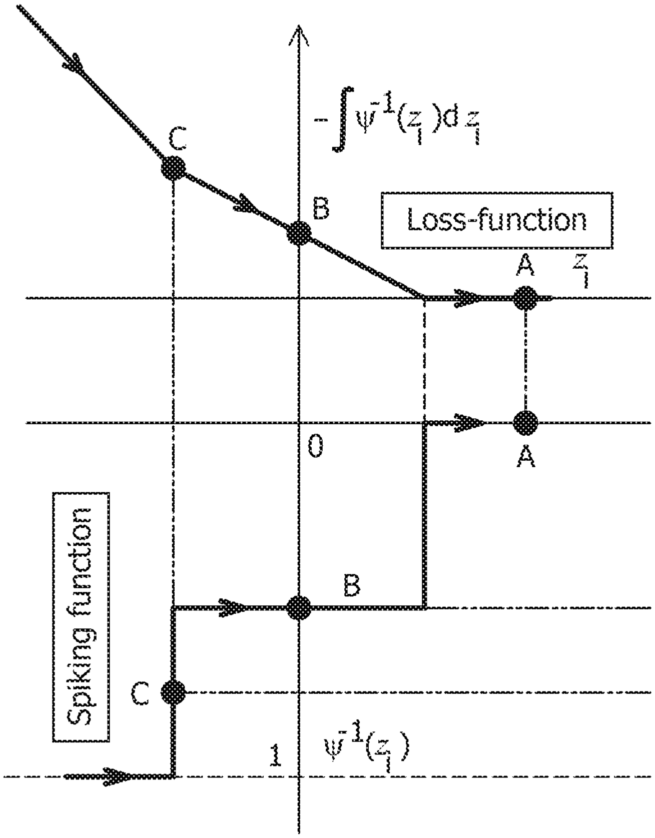
FIG. 14B is a primal-dual optimization framework for connecting neural-dynamics to network-level dynamics and showing a loss function and a spiking function.
Figure 14C:
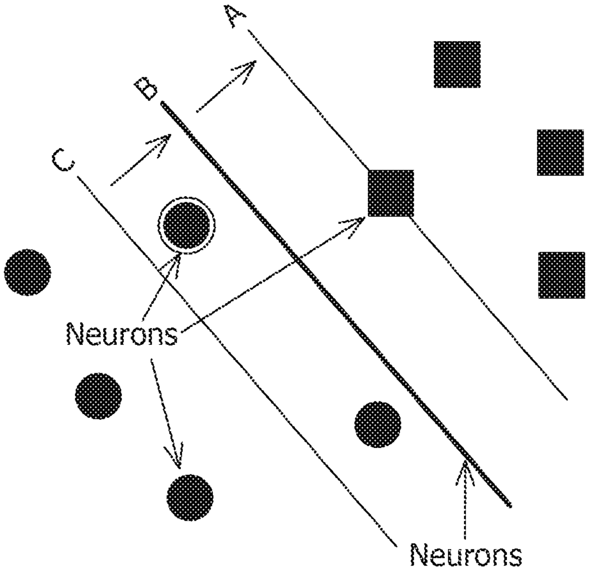
FIG. 14C is a primal-dual optimization framework for connecting neural-dynamics to network-level dynamics and showing neurons and the network.
Figure 14D:
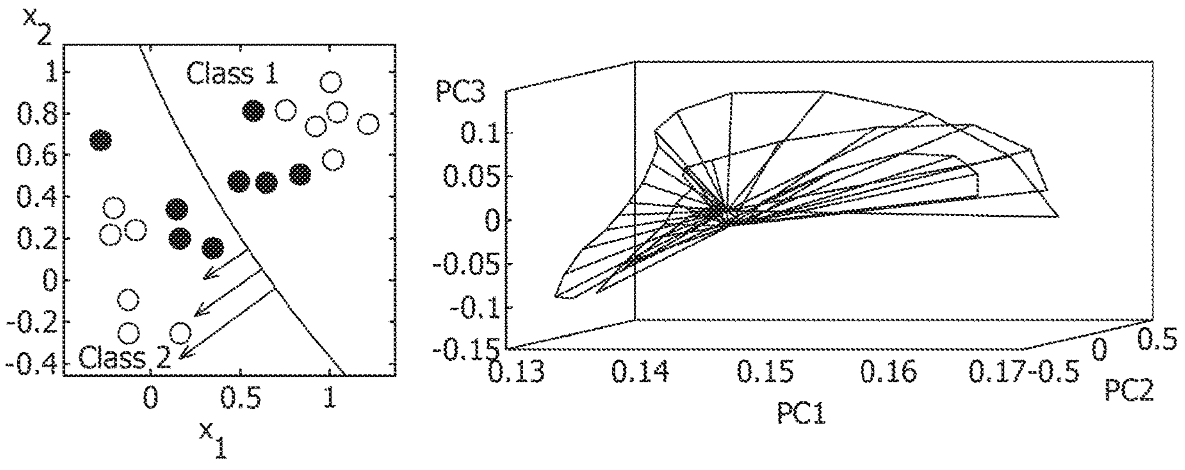
FIG. 14D is a first response trajectory and its interpretation as equivalent dynamics of a high-dimensional hyperplane.
Figure 14E:
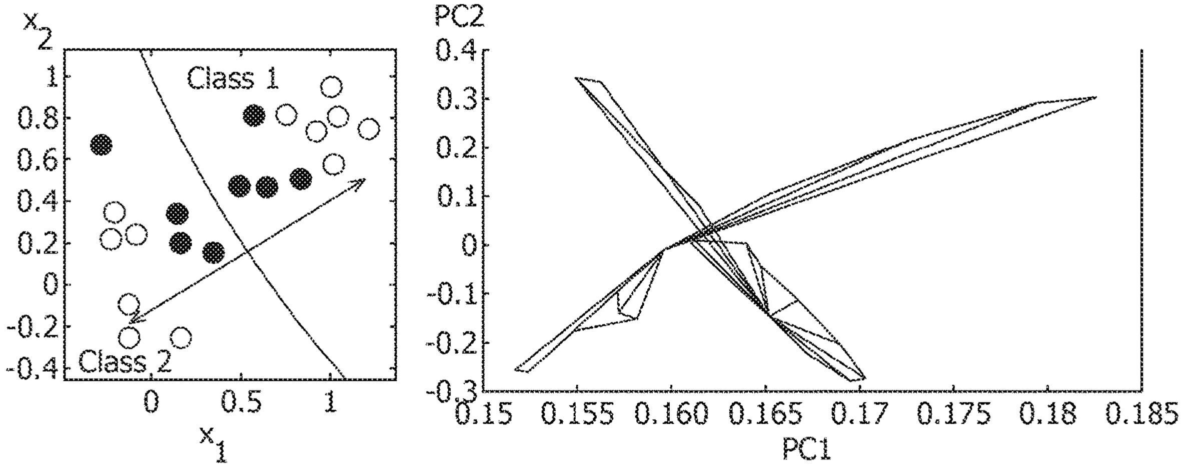
FIG. 14E is a second response trajectory and its interpretation as equivalent dynamics of a high-dimensional hyperplane.
Figure 14F:
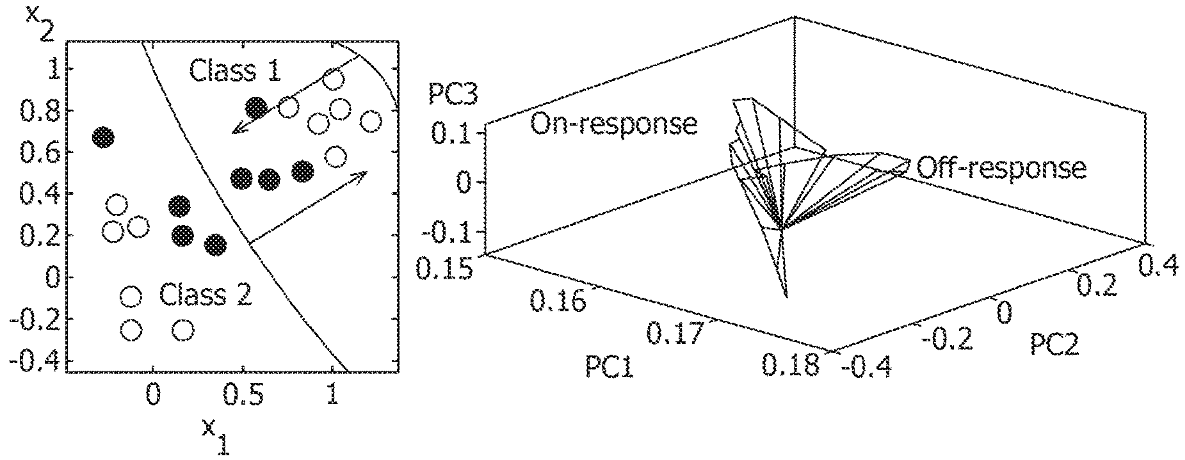
FIG. 14F is a third response trajectory and its interpretation as equivalent dynamics of a high-dimensional hyperplane.

A geometric approach to achieve primal-dual mapping is illustrated in FIGS. 14A-F. FIGS. 14A-F show primal-dual optimization framework for connecting neural-dynamics to network-level dynamics. Under the assumption that the coupling matrix Q is locally positive-definite, each of the neural responses (V) can be mapped into a network variable, referred to as the margin through a Legendre transform that relates the spiking function to the spiking energy or a regularization function as illustrated in FIG. 14A. Using the margin, an equivalent primal loss-function can be obtained by integrating the inverse of the spiking function, as illustrated in FIG. 14B. In the primal space, each neuron is mapped to a vector space and the margin is interpreted as the distance of the neuron from a hyper-plane. This is illustrated in FIGS. 14A-F, which also shows that, while a neuron i spikes while traversing the path C-B-A-B-C in the dual-space, or regularization function, at the network level, or the primal-space, a stimuli hyper-plane oscillates along the trajectory C-B-A-B-C with respect to the neural constellation. These dynamics translates to encoding of information through different statistical measures of each of the neuron's responses, like the mean-firing-rate or latency-coding. As described above, mean firing rate over time is a coding scheme that claims that the spiking frequency or rate increases with the intensity of stimulus. A temporal code like latency-code, on the other hand, claims that the first spike after the onset of stimulus contains all the information, and the time-to-first-spike is shorter for a stronger stimulus. Using the primal-dual formulation shows only neurons close to the stimuli hyperplane (referred to as support vector neurons) generate spikes, whereas the neurons far away from the stimuli hyperplane remain silent or only respond with sub-threshold oscillations. For example, intensity encoding could be explained by different levels of perturbation to the stimuli hyperplane, as shown in FIG. 14D. With the increase in intensity, the hyperplane moves closer to the neurons, thus increasing the overall network firing rate and recruiting new neurons that were previously silent. In this case, the trajectories generated by the neural populations span the same sub-space but increase in cross-sectional area, as shown in FIG. 14D. For identity coding, the population of neurons could respond to different stimuli hyperplane, as shown in FIG. 14E. As a result, different populations of neurons are recruited which results in trajectories that span different parts of the sub-space, as shown in FIG. 14E. The preliminary results in FIG. 14E thus bears similarity with the sub-space trajectories that obtained using electrophysiological recordings from neurons in an insect antenna lobe. In this case the stimuli hyperplane is non-linear (lies in a high-dimensional space), as shown in FIG. 14F. Perturbation of this hyper-plane results in recruitment of neurons that produce sub-space trajectories shown in FIG. 14F, which are orthogonal to each other.

Figure 15:
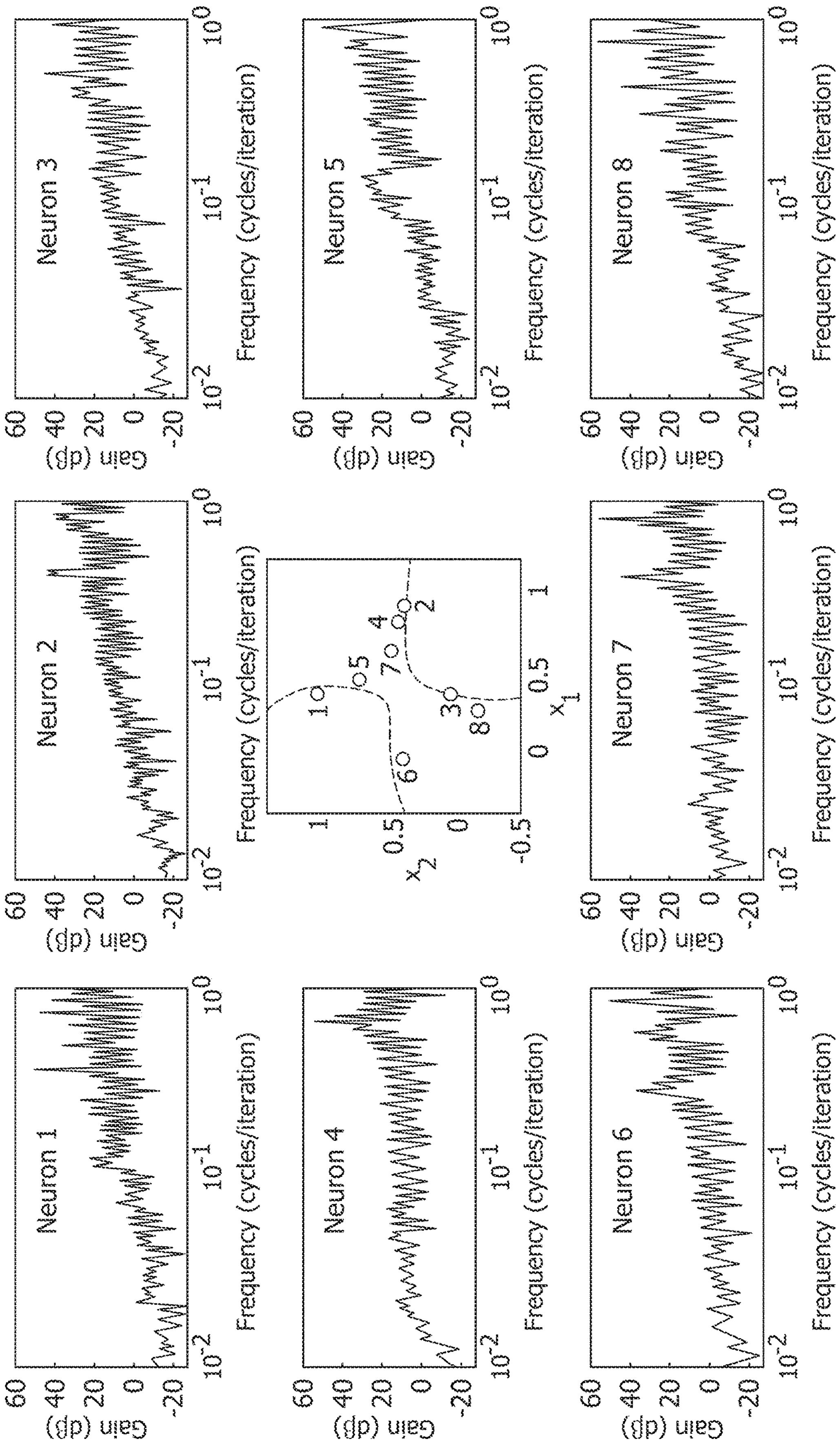
FIG. 15 is a plot showing emergent noise-shaping behavior corresponding to 8 different neurons located at different margins with respect to a high-dimensional hyperplane.

A GTNN can also combine learning and noise-shaping, whereby the neurons that are important for discrimination, are closer to the stimuli hyperplane, and exhibit a more pronounced noise-shaping effect. This is illustrated in FIG. 15 for a specific constellation of "support-vector" neurons that are located near the classification hyperplane. Each of these neurons were found to have learned to produce a specific noise-shaping pattern signifying its importance to the classification task.

Figure 16A:
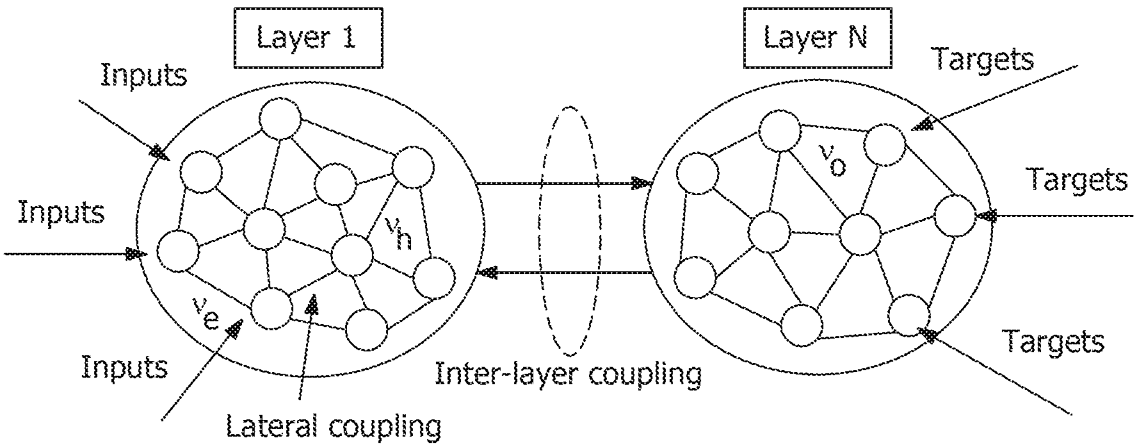
FIG. 16A is a model for training a multi-layer GTNN by minimizing network energy while the input and target signals are held constant.
Figure 16B:
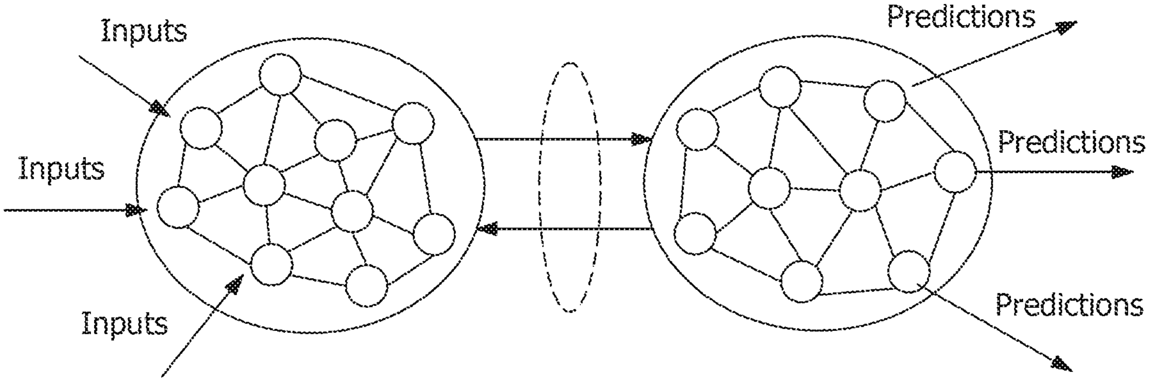
FIG. 16B is a model of inference in GTNN as an equivalent associative memory.
Figure 16C:
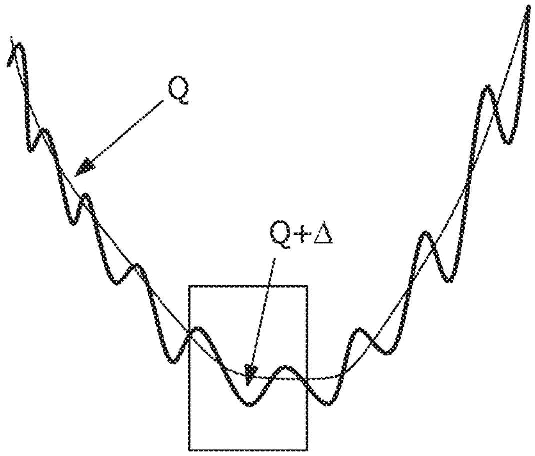
FIG. 16C is snapshot of exploiting local-minima due to a non-positive definite perturbation to synaptic weights for implementing analog memory.

Investigating real-time learning algorithms for GT neural network is critical to investigate a dynamical systems approach to adapt Q such that the network can solve a recognition task, as opposed to assuming the synaptic matrix Q to be fixed. In this regard, most learning algorithms are energy-based, developed with the primary objective of minimizing the error in inference and the energy functional captures dependencies among variables, for example, features and class labels. Learning in this case consists of finding an energy function that associates low energies to observed configurations of the variables, and high energies to unobserved ones. The energy function models the average error in prediction made by a network when it has been trained on some input data, so that inference is reduced to the problem of finding a good local minimum in this energy landscape. In the proposed approach, learning would mean optimizing the network for error in addition to energy, which in this case models a different system objective—the one of finding optimal neural responses. This is illustrated in FIG. 16A, where the input features and the target are presented as inputs (b) to different neurons in the network. The network topology such as, number of layers, degree of lateral coupling, and cross-coupling between the layers will be a variable that will be chosen based on the complexity of the learning task. Like an associative memory, the synaptic matrix Q will be adapted such that the network reaches a low-energy state. During the inference, shown in FIG. 16B, when only the input features are presented, the lowest energy state would correspond to the predicted labels/outputs. This is similar to the framework of an associative memory.

To achieve this task, a min-max optimization technique is investigated that will balance the short-term dynamics determined by the activity of neurons with the long-term dynamics determined by the activity of the synapses. The formulation is summarized as $$\max_{Q_{ij}}\min_{V_i} H(\{V_i\}, \{Q_{ij}\}) \qquad \text{EQ. 36}$$

$$|V_i| < 1; \sum_{j \in \{S\}} Q_{ij} = 1$$

where the metabolic cost function H will be maximized with respect to synaptic matrix Q, in addition to the minimization with respect to the neuronal responses. A normalization constraint shown in EQ. 36 is imposed which will ensure that the synaptic weights are sparse and don't decay to zero. This will also ensure that growth-transformations could be used for adapting Q, as shown in $$\tau_s \frac{dQ_{ij}}{dt} = S_{ij}(V_i V_j) \qquad \text{EQ. 37}$$

For instance, if the normalization constraint $Q_{ij}+Q_{ji}=1$ is imposed, then the form of adaptation will not only model the conventional Hebbian learning but will also model learning due to spike-timing-dependent-plasticity (STDP). The time-constant r is chosen to ensure a balance between the short-term neuronal dynamics and long-term synaptic dynamics.

The min-max optimization for a simple learning problem comprising of one-layer auto-encoder network that performs inherent clustering in a feature space is investigated, followed by a layer of supervised learning to match inputs with the correct class labels. How the same general form of the cost function can perform both clustering and linear separation by introducing varying amounts of non-linearity at each layer is then investigated. For example, normalization of neural responses, along with a weaker regularization, introduces a compressive non-linearity in the neural responses at the hidden layer. This will be a by-product of optimizing the network objective function itself, and not a result of imposing an explicit non-linearity such as sigmoid, tanh, etc. at each neuron. This moreover has the capacity, through proper initialization of weights, to ensure that each hidden neuron preferentially responds to one region of the feature space, by tuning the weights in that direction. As such, it eradicates the need of modifying the network objective function, reconstruction error, to include cluster assignment losses, as is usually done in auto-encoder based clustering techniques to ensure similar data are grouped into the same clusters. The learning framework is then applied to a large-scale network comprising of 10-100 hidden layers comprising of 1 million to 100 million neurons. A GPU-based GT neural network accelerator is capable simulating 20 million neurons in near real-time. Since the network as a whole solves for both the optimal neural responses and synaptic weights through an optimization process, the non-linear neural responses at any layer will converge not in a single step of computation, but rather in a continuous manner. By appropriately adapting the modulation function for the neurons and the synaptic time-constant, intermediate responses are ensued to be continuously transmitted to the rest of the network through synapses. This ensures that all layers in the network can be updated simultaneously and in an asynchronous fashion. This is a new way of bypassing temporal non-locality of information that is often a bottleneck in neural networks, allowing dependent layers in the network to continuously update even when the preceding layers have not converged to their final values for a specific input.

While the dynamics of the proposed GTNN could be simulated using a GPU-based digital hardware accelerator, the underlying energy-efficiency advantages could only be realized when the architecture is mapped onto analog hardware and shows the importance of investigating scalability of GTNN on analog platforms. This mapping results in several variants of analog support-vector-machines. However, one of the challenges of implementing large-scale analog neural network is scaling the synaptic connectivity to millions or billions of neurons. Another limitation arises due to the lack of a reliable analog memory and the underlying cost of updating the contents of the memory. Overcoming both these limitations by exploiting some unique properties of the proposed fully coupled continuous-time architecture is important to GTNN performance.

Figure 17:
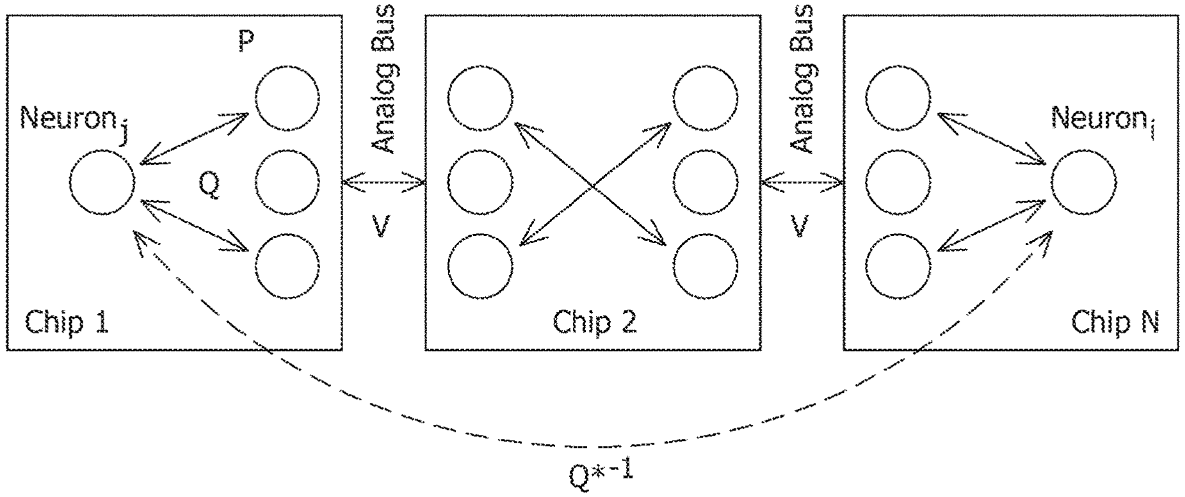
FIG. 17 is a model of virtual connectivity between neurons distributed across different chipsets achieved by primal-dual mapping.

The common approach to implement a large-scale spiking neuromorphic processor is to use an address event representation (AER) technique to route spikes over a digital bus. A spike generated by a neuron on one processor is routed to a neuron located on another processor by packetizing the source/destination information using an AER encoder/decoder, typically co-located on every neuromorphic processor. This encoding is not possible for transmitting analog signals which is only practical for connectivity across neighboring processors/chips. This is illustrated in FIG. 17 for a one-dimensional connectivity, where the limited number of input/output ports on each chip is used to form point-to-point analog connectivity. However, the proposed fully-coupled approach enables a unique way to route analog information and spikes using only local connectivity. The principle is $V=\varphi^{-1}(QV+b)$, $\|V\|_\infty<1$ for sparse and $V=Q^{*-1}\varphi(V)-b^*$, $\|V\|_\infty<1$ for non-spare in primal-dual mapping. Thus, even though the physical interconnectivity matrix Q, determined by point-to-point local connectivity, is sparse, its pseudo-inverse Q* might not be. As a result, a neuron j could be virtually connected to neuron i, as shown in FIG. 17, due to the first-order primal-dual conditions shown in FIG. 9E. Different analog bus topologies that enable different types of virtual connectivity are now described. The primal-dual mapping between the sparse physical connectivity (Q) and the non-sparse virtual connectivity (Q*) will be posed as an optimization problem that is will constrained according to physical 2D, 3D and random connectivity between processors 1-N.

Reliable and scalable analog memory has been one of the challenges in the implementation of analog and continuous time processors. While some of the emerging memories like memristors or synaptic elements could be used to implement analog memories, and in-memory computation, the complexity arises due to heterogeneous integration into CMOS and sometimes an elaborate addressing mechanism for programming. The procedure not only dissipates significant energy, but in many cases the non-linearity and hysteresis in the device complicates the underlying update rule. Growth transform network may be used as an associative memory, where the synaptic junction $Q_{ij}$. is updated according to EQ. 37. By ensuring that Q is locally non-positive definite, the network can be controlled to converge to a local minima, as shown in FIG. 16E, which then acts as a memory as long as the circuit is powered. The concept was illustrated above in FIG. 9E for a 4 neuron network connected by a non-positive definite connectivity matrix. It can be seen that the application of the stimulus 1 pushes the network to a specific limit cycle which is retained even after the stimulus is turned off Application of the second stimulus moves the network to another attractor or limit-cycle. Using different forms of the synaptic dynamics, different ways to generate and store limit-cycle patterns which will act as a long-term storage can be investigated. The intrinsic network latency can be exploited to implement large time-constants required for synaptic updates.

Figure 18A:
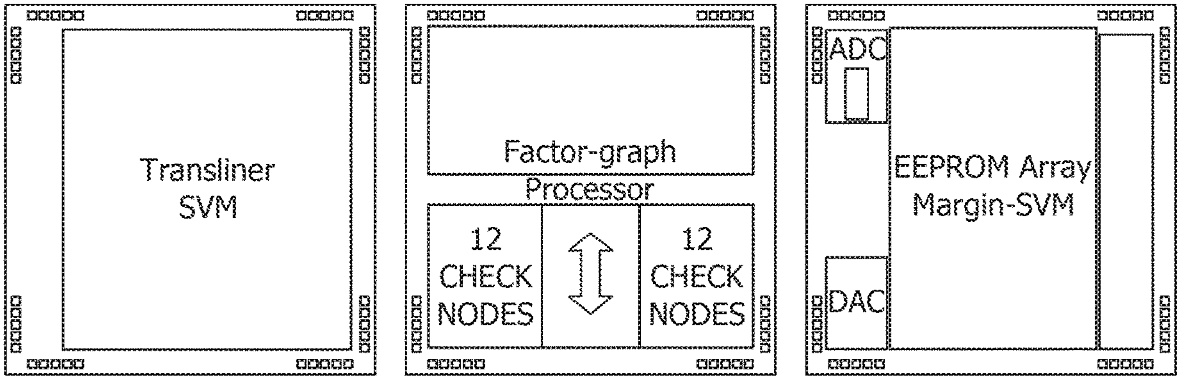
FIG. 18A is an implementation of analog support-vector-machines system on-chip and large scale analog dynamical systems.
Figure 18B:
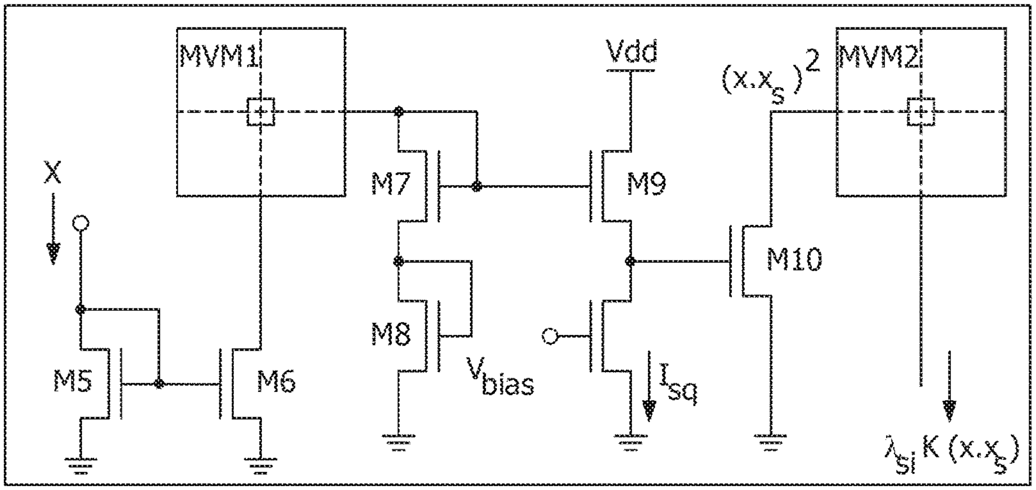
FIG. 18B is circuit schematic representation of the implementation in FIG. 18A.
Figure 18C:
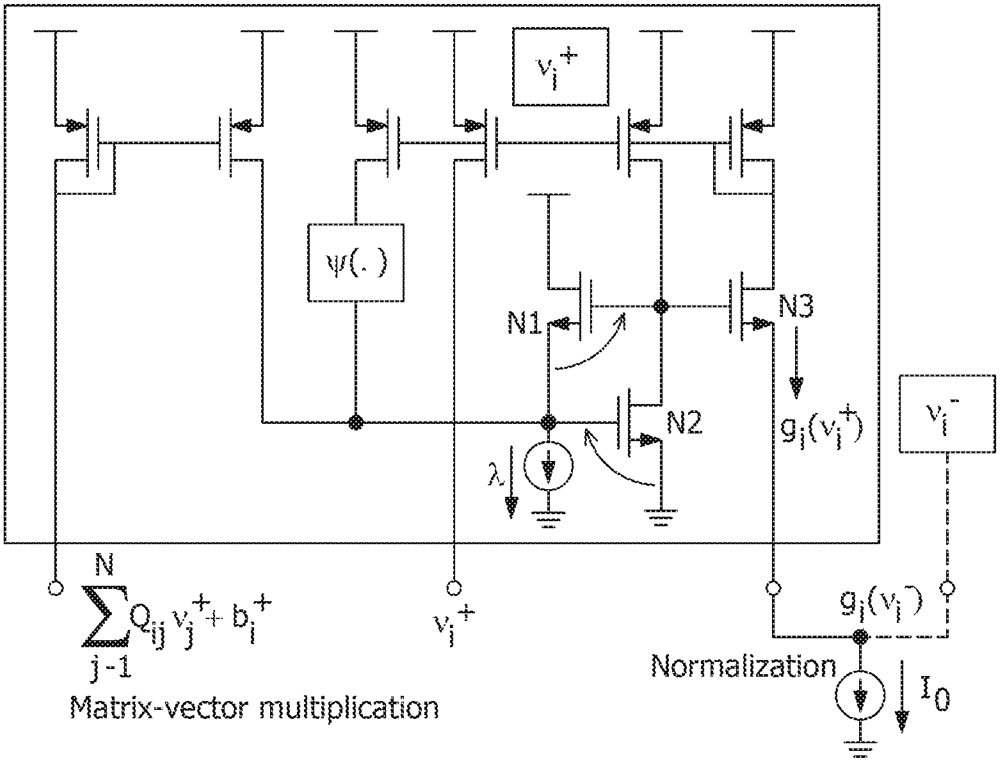
FIG. 18C is a schematic of a sub-threshold and translinear circuits for implementing matrix-vector multiplication and continuous time growth transforms.

Next, an integrated circuit prototype which implements growth transform neurons and the corresponding synaptic update rules is implemented. For this purpose, sub-threshold and translinear/current-mode analog circuit topologies are leveraged. Some of the examples of system-on-chip prototypes are shown in FIG. 18A which have been used for implementing classifiers and pattern recognizers with sub-microwatt power budgets. Different continuous-time growth-transform circuits have been investigated that can implement the basic neuron model. FIG. 18B shows a differential variant of the neuron model circuit which is based on a growth transform optimization circuit. FIG. 18C shows a similar previously reported sub-threshold and translinear circuit for implementing matrix-vector-multiplication continuous time growth transforms. These circuits use basic translinear elements to implement normalization and multiplication. A similar circuit was used to implement the synaptic update rule, however, current starving techniques were used to modulate the learning time-constants T. An analog matrix-vector multiplication module was used to generate the inputs to the neuron. A simple current comparator was used to implement the spiking function p. The designed prototypes were fabricated in a standard CMOS process and the functionality of the fabricated prototype using some synthetic datasets was verified.

Evaluation included validation of both the GTNN algorithms and GTNN processor for benchmark real-time learning tasks. The current version of the GTNN software is able to simulate a network of 20 million neurons in real-time (spiking rate of 1-100 Hz) on a GPU-based accelerator. Enhancements include incorporating long-term and real-time learning dynamics for different network topologies and connectivity. Even though the proposed framework is applicable and scalable to most real-time learning task, the system was validated for a real-time speaker recognition task. A universal challenge has been to learn to identify new speakers and under varying environmental conditions. First, a benchmark GTNN network was trained to recognize 10 speakers out of a possible 100 speakers from a YOHO dataset. During the run-time environment, the features were presented corresponding to the rest of the 90 speakers, sequentially in time. In some cases, the labels, or reinforcement, were presented to the network in addition to the features shown in FIG. 16A. The goal was to verify if the GTNN network could learn to track/identify that each of those 90 speakers over time. For validating the functionality of the GTNN processor, a reduced dataset with the speech features comprising of only 14 Mel-frequency coefficients was used. During the hardware evaluations, the energy-dissipated were documented to maintain the trained state of the GTNN processor, and the energy required to incrementally train the network for each new example.

A new spiking neuron and population model based on the Growth Transform dynamical system has been described. The system minimizes an appropriate energy functional under realistic physical constraints to produce emergent spiking activity in a population of neurons. This disclosure treats the spike generation and transmission processes in a spiking network as an energy-minimization problem involving continuous-valued neural state variables like the membrane potential. The neuron model and its response are tightly coupled to the network objective, and are flexible enough to incorporate different neural dynamics that have been observed at the cellular level in electrophysiological recordings.

The general approach described above offers an elegant way to design neuromorphic machine learning algorithms by bridging the gap that currently exists between bottom-up models that can simulate biologically realistic neural dynamics but do not have a network-level representation, and top-down machine learning models that start with a network loss function, but reduce the problem to the model of a non-spiking neuron with static non-linearities. In this regard, machine learning models are primarily developed with the objective of minimizing the error in inference by designing a loss function that captures dependencies among variables, for example, features and class labels. Learning in this case consists of adapting weights in order to associate low energies, or losses, to observed configurations of variables, and high energies, to unobserved ones. The non-differentiable nature of spiking dynamics makes it difficult to formulate loss functions involving neural variables. Neuromorphic algorithms currently work around this problem in different ways, including mapping deep neural nets to spiking networks through rate-based techniques, formulating loss functions that penalize the difference between actual and desired spike-times, or approximating the derivatives of spike signals through various means. Formulating the spiking dynamics of the entire network using an energy function involving neural state variables across the network would enable direct use of the energy function itself for learning weight parameters. Since the proposed energy function encompasses all the neurons in the network, and not just the "visible neurons" as in most neuromorphic machine learning algorithms, it can potentially enable easier and more effective training of hidden neurons in deep networks. Moreover, it would allow incorporation and experimentation with biologically relevant neural dynamics that could have significant performance and energy benefits.

This neuron-to-network energy-efficiency gap can be addressed by using a fully-coupled, analog neuromorphic architecture where the entire learning network is designed as a unified dynamical system that encodes information using short-term and long-term network dynamics.

Figure 19A:
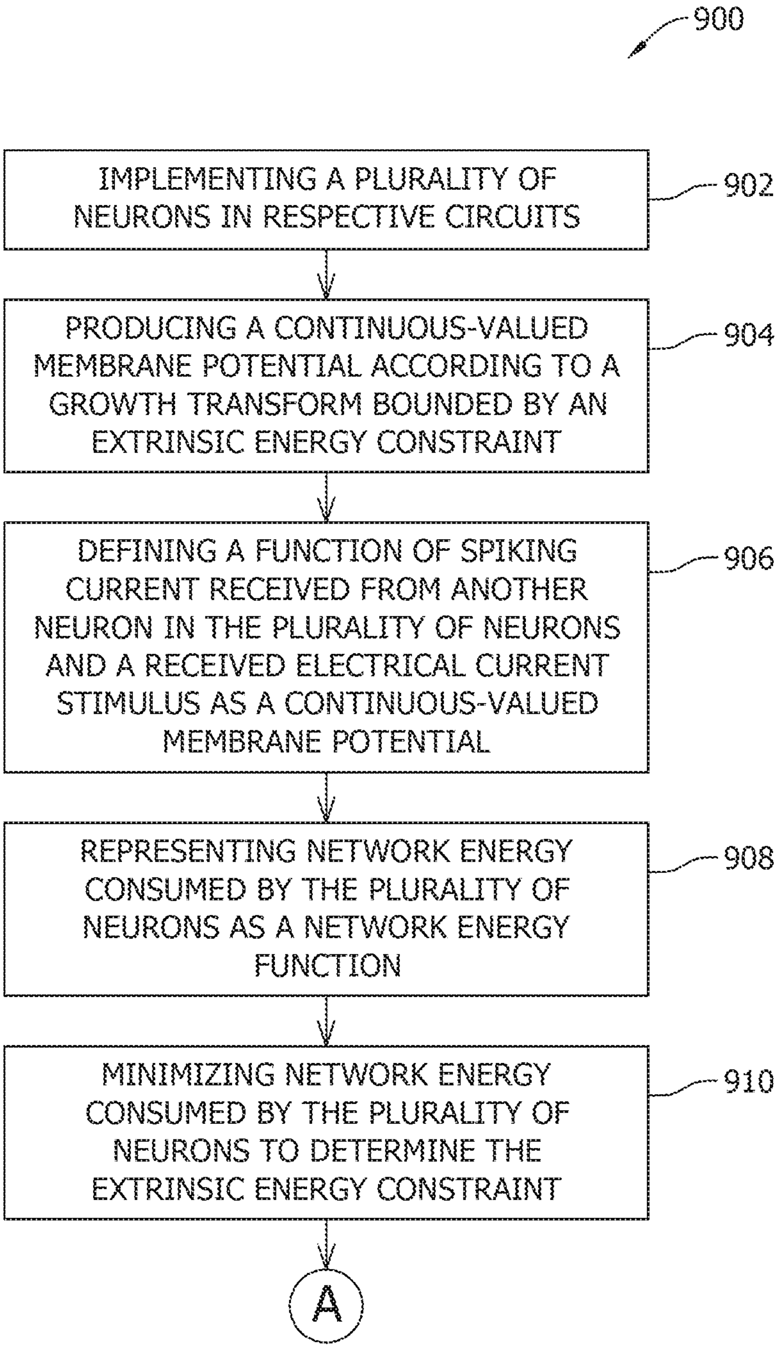
FIG. 19A is a flowchart for operating a neural network.
Figure 19B:
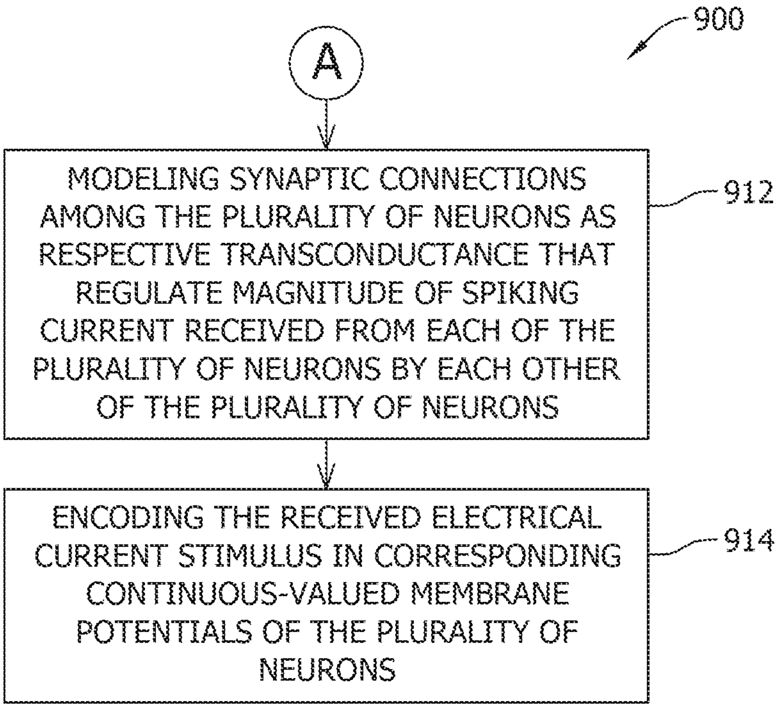
FIG. 19B is a continuation of the flowchart in FIG. 19A.

A method for designing energy-efficient, real-time neuromorphic processors using growth-transform neural network (GTNN) based dynamical systems is described. FIG. 19A and FIG. 19B show a flowchart 900 of a method of operating a neural network in accordance with this disclosure. The flowchart 900 includes implementing 902 a plurality of neurons in respective circuits, producing 904 a continuous-valued membrane potential according to a Growth Transform bounded by an extrinsic energy constraint, defining 906 a function of spiking current received from another neuron in the plurality of neurons, and a received electrical current stimulus, as a continuous-valued membrane potential, representing 908 network energy consumed by the plurality of neurons as a network energy function, minimizing 910 network energy consumed by the plurality of neurons to determine the extrinsic energy constraint, modeling 912 synaptic connections among the plurality of neurons as respective transconductances that regulate magnitude of spiking currents received from each of the plurality of neurons by each other of the plurality of neurons, and encoding 914 the received electrical current stimulus in corresponding continuous-valued membrane potentials of the plurality of neurons. Learning and inference are integrated using a combination of short-term and long-term population dynamics of spiking neurons. Each of the various stimuli (features and labels) are encoded as high-dimensional trajectories and real-time learning involves adapting the trajectories in accordance to an underlying online optimization problem. The GTNN exploits population dynamics to improve system energy-efficiency, while optimizing a learning or task objective in real-time. Short-term and long-term network dynamics enable scaling the GTNN to billions of neurons without the need for explicit spike-routing and by exploiting network's limit-cycle fixed-points as analog memory. The method may use a continuous-time, analog GTNN processor that may be used to demonstrate the energy-efficiency of the method compared to other benchmark neuromorphic and deep-learning processors. The method accomplishes fundamental breakthroughs in neuromorphic computing and hardware, and will also provide a translation opportunity for machine learning applications that demand high energy-efficiency.

Technical advantages of this disclosure is allowing for independent control over three neuro-dynamical properties: (a) control over the steady-state population dynamics that encodes the minimum of an exact network energy functional; (b) control over the shape of the action potentials generated by individual neurons in the network without affecting the network minimum; and (c) control over spiking statistics and transient population dynamics without affecting the network minimum or the shape of action potentials. At the core of the model are different variants of Growth Transform dynamical systems that produce stable and interpretable population dynamics, irrespective of the network size and the type of neuronal connectivity (inhibitory or excitatory). This model has been configured to produce different types of single-neuron dynamics as well as population dynamics. The network is shown to adapt such that it encodes the steady-state solution using a reduced number of spikes upon convergence to the optimal solution. This network constructs a spiking associative memory that uses fewer spikes compared to conventional architectures, while maintaining high recall accuracy at high memory loads.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein. Aspects of the disclosure may also be practiced in distributed computing environments where tasks are performed by remote processing devices that are linked through a communications network. In a distributed computing environment, program modules may be located in both local and remote computer storage media including memory storage devices.

The computer systems, computing devices, and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on vehicle or mobile devices, or associated with smart infrastructure or remote servers), and/or via computer executable instructions stored on non-transitory computer-readable media or medium.

In some aspects, a computing device is configured to implement machine learning, such that the computing device "learns" to analyze, organize, and/or process data without being explicitly programmed. Machine learning may be implemented through machine learning (ML) methods and algorithms. In one aspect, a machine learning (ML) module is configured to implement ML methods and algorithms. In some aspects, ML methods and algorithms are applied to data inputs and generate machine learning (ML) outputs. Data inputs may include but are not limited to: images or frames of a video, object characteristics, and object categorizations. Data inputs may further include: sensor data, image data, video data, telematics data, authentication data, authorization data, security data, mobile device data, geolocation information, transaction data, personal identification data, financial data, usage data, weather pattern data, "big data" sets, and/or user preference data. ML outputs may include but are not limited to: a tracked shape output, categorization of an object, categorization of a type of motion, a diagnosis based on motion of an object, motion analysis of an object, and trained model parameters ML outputs may further include: speech recognition, image or video recognition, medical diagnoses, statistical or financial models, autonomous vehicle decision-making models, robotics behavior modeling, fraud detection analysis, user recommendations and personalization, game AI, skill acquisition, targeted marketing, big data visualization, weather forecasting, and/or information extracted about a computer device, a user, a home, a vehicle, or a party of a transaction. In some aspects, data inputs may include certain ML outputs.

In some aspects, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, dimensionality reduction, and support vector machines. In various aspects, the implemented ML methods and algorithms are directed toward at least one of a plurality of categorizations of machine learning, such as supervised learning, unsupervised learning, and reinforcement learning.

In one aspect, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function which maps outputs to inputs and utilize the predictive function to generate ML outputs based on data inputs. The example inputs and example outputs of the training data may include any of the data inputs or ML outputs described above. For example, a ML module may receive training data comprising customer identification and geographic information and an associated customer category, generate a model which maps customer categories to customer identification and geographic information, and generate a ML output comprising a customer category for subsequently received data inputs including customer identification and geographic information.

In another aspect, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship. In one aspect, a ML module receives unlabeled data comprising customer purchase information, customer mobile device information, and customer geolocation information, and the ML module employs an unsupervised learning method such as "clustering" to identify patterns and organize the unlabeled data into meaningful groups. The newly organized data may be used, for example, to extract further information about a customer's spending habits.

In yet another aspect, ML methods and algorithms are directed toward reinforcement learning, which involves optimizing outputs based on feedback from a reward signal. Specifically ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In one aspect, a ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict a user selection.

As will be appreciated based upon the foregoing specification, the above-described aspects of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed aspects of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples. The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A spiking neural network comprising:

a plurality of neurons implemented in respective circuits, each neuron configured to:

produce a continuous-valued membrane potential according to a Growth Transform bounded by an extrinsic energy constraint, the continuous-valued membrane potential defined as a function of spiking current received from another neuron in the plurality of neurons, and a received electrical current stimulus; and a network energy function representing network energy consumed by all of the plurality of neurons; and a neuromorphic framework integrating learning and inference using (i) short-term dynamics determined by activity of the plurality of neurons, and (ii) long-term dynamics determined by activity of a plurality of synaptic connections among the plurality of neurons, the neuromorphic network configured to:

implement the network energy function with a neuronal and synaptic time constant to minimize network energy consumed by the plurality of neurons to determine the extrinsic energy constraint, including performing a min-max optimization technique that applies the neuronal and synaptic time constant with respect to the network energy function to balance neural responses associated with the short-term dynamics with synaptic weights associated with the long-term dynamics, such that all layers in the spiking neural network can be updated simultaneously and asynchronously irrespective of if preceding layers of the spiking neural network have yet to converge to a final value;

model the plurality of synaptic connections among the plurality of neurons as respective transconductances that regulate magnitude of spiking currents received from each of the plurality of neurons by each other of the plurality of neurons; and encode the received electrical current stimulus in corresponding continuous-valued membrane potentials of the plurality of neurons using mean spiking rates, inter-spike intervals, and changes in spiking rates.

2. The spiking neural network of claim 1, wherein the Growth Transform ensures that the membrane potentials are always bounded.

3. The spiking neural network of claim 1, wherein the extrinsic energy constraint includes power dissipation due to coupling between neurons, power injected to or extracted from the plurality of neurons as a result of external stimulation, and power dissipated due to neural responses.

4. The spiking neural network of claim 1, wherein each neuron of the plurality of neurons includes a modulation function that modulates response trajectories of the plurality of neurons without affecting the minimum network energy and a steady-state solution.

5. The spiking neural network of claim 4, wherein the modulation function is varied to tune transient firing statistics to model cell excitability of the plurality of neurons.

6. The spiking neural network of claim 1, wherein at least one of a barrier and penalty function to enable finer control over spiking responses of the plurality of neurons.

7. The spiking neural network of claim 1, wherein the spiking neural network is an associative memory network that uses the Growth Transform to store and recall memory patterns for the plurality of neurons.

8. The spiking neural network of claim 1, wherein the spiking neural network is implemented on fully continuous-time analog architecture.

9. A method of operating a neural network, the method comprising:

implementing a plurality of neurons in respective circuits;

producing a continuous-valued membrane potential according to a Growth Transform bounded by an extrinsic energy constraint;

defining a function of spiking current received from another neuron in the plurality of neurons, and a received electrical current stimulus, as a continuous-valued membrane potential;

representing network energy consumed by all of the plurality of neurons as a network energy function;

implementing a neuromorphic framework integrating learning and inference using (i) short-term dynamics determined by activity of the plurality of neurons, and (ii) long-term dynamics determined by activity of a plurality of synaptic connections among the plurality of neurons by:

implementing the network energy function with a neuronal and synaptic time constant to minimize network energy consumed by the plurality of neurons to determine the extrinsic energy constraint, including performing a min-max optimization technique that applies the neuronal and synaptic time constant with respect to the network energy function to balance neural responses associated with the short-term dynamics with synaptic weights associated with the long-term dynamics, such that all layers in the neural network can be updated simultaneously and asynchronously irrespective of if preceding layers of the neural network have yet to converge to a final value;

modeling the plurality of synaptic connections among the plurality of neurons as respective transconductances that regulate magnitude of spiking currents received from each of the plurality of neurons by each other of the plurality of neurons, wherein the modeling includes using gradient discontinuities to modulate the spiking currents; and encoding the received electrical current stimulus in corresponding continuous-valued membrane potentials of the plurality of neurons using an average input of the membrane potentials and a sum of the membrane potentials.

10. The method of claim 9, further comprising bounding the membrane potentials by the Growth Transform always.

11. The method of claim 10, further comprising including power dissipation due to coupling between neurons, injecting power to or extracted from the plurality of neurons as a result of external stimulation, and dissipating power due to neural responses in the extrinsic energy constraint.

12. The method of claim 10, further comprising including a modulation function for each neuron of the plurality of neurons that modulates response trajectories of the plurality of neurons without affecting the minimum network energy and a steady-state solution, wherein varying the modulation function tunes transient firing statistics to model cell excitability of the plurality of neurons.

13. The method of claim 10, further comprising enabling finer control over spiking response of the plurality of neurons with a barrier or penalty function.

14. The method of claim 10, further comprising using the Growth Transform to store and recall memory patterns for the plurality of neurons to enable the neural network to be an associative memory network.

15. The method of claim 10, further comprising implementing the neural network on fully continuous-time analog architecture.

16. At least one non-transitory computer-readable storage medium having computer-executable instructions embodied thereon for operating a neural network, wherein when executed by at least one processor, the computer-executable instructions cause the processor to:

implement a plurality of neurons in respective circuits;

produce a continuous-valued membrane potential according to a Growth Transform bounded by an extrinsic energy constraint, define a function of spiking current received from another neuron in the plurality of neurons, and a received electrical current stimulus, as a continuous-valued membrane potential;

represent network energy consumed by all of the plurality of neurons as a network energy function;

implement a neuromorphic framework that includes integrating learning and inference using (i) short-term dynamics determined by activity of the plurality of neurons, and (ii) long-term dynamics determined by activity of a plurality of synaptic connections among the plurality of neurons, the neuromorphic network configured to:

implement the network energy function with a neuronal and synaptic time constant to minimize network energy consumed by the plurality of neurons to determine the extrinsic energy constraint, including performing a min-max optimization technique that applies the neuronal and synaptic time constant with respect to the network energy function to balance neural responses associated with the short-term dynamics with synaptic weights associated with the long-term dynamics, such that all layers in the neural network can be updated simultaneously and asynchronously irrespective of if preceding layers of the neural network have yet to converge to a final value;

model the plurality of synaptic connections among the plurality of neurons as respective transconductances that regulate magnitude of spiking currents received from each of the plurality of neurons by each other of the plurality of neurons, wherein the modeling includes modeling fixed points of network energy, neural responses, and at least one of spiking statistics and transient neural dynamics; and encode the received electrical current stimulus in corresponding continuous-valued membrane potentials of the plurality of neurons using an average input of the membrane potentials and a sum of the membrane potentials.

17. The computer-readable storage medium of claim 16, wherein the computer-executable instructions cause the processor to always bound the membrane potentials by the Growth Transform.

18. The computer-readable storage medium of claim 16, wherein the computer-executable instructions cause the processor to include power dissipation due to coupling between neurons, inject power to or extracted from the plurality of neurons as a result of external stimulation, and dissipate power due to neural responses in the extrinsic energy constraint.

19. The computer-readable storage medium of claim 16, wherein the computer-executable instructions cause the processor to include a modulation function for each neuron of the plurality of neurons that modulates response trajectories of the plurality of neurons without affecting the minimum network energy and a steady-state solution, wherein varying the modulation function tunes transient firing statistics to model cell excitability of the plurality of neurons.

20. The computer-readable storage medium of claim 16, wherein the computer-executable instructions cause the processor to enable finer control over spiking response of the plurality of neurons with a barrier or penalty function, using the Growth Transform to store and recall memory patterns for the plurality of neurons to enable the neural network to be an associative memory network, and implementing the neural network on fully continuous-time analog architecture.

* * * * *